(12) United States Patent
Takahashi et al.

(10) Patent No.: US 6,555,248 B1
(45) Date of Patent: Apr. 29, 2003

(54) MAGNETIC RECORDING MEDIUM

(75) Inventors: Migaku Takahashi, 20-2, Hitokida 2-chome, Taihaku-ku, Sendai-shi, Miyagi-ken (JP), 982-02; Junichi Nakai, Miyagi-ken (JP)

(73) Assignee: Migaku Takahashi, Miyagi-ken (JP)

( * ) Notice: Subject to any disclaimer, the term of this patent is extended or adjusted under 35 U.S.C. 154(b) by 0 days.

(21) Appl. No.: 09/402,013
(22) PCT Filed: Mar. 28, 1997
(86) PCT No.: PCT/JP97/01090
§ 371 (c)(1),
(2), (4) Date: Dec. 14, 1999
(87) PCT Pub. No.: WO98/44490
PCT Pub. Date: Oct. 8, 1998

(51) Int. Cl.[7] .............................. G11B 5/66; G11B 5/70; H01F 1/00
(52) U.S. Cl. ................. 428/611; 428/667; 428/694 TS; 428/900
(58) Field of Search ..................... 428/694 TS, 694 TR, 428/900, 65.7, 611, 667

(56) References Cited

U.S. PATENT DOCUMENTS 5,853,847 A * 12/1998 Takahashi ................... 428/141

FOREIGN PATENT DOCUMENTS

JP           95/03603        7/1994

OTHER PUBLICATIONS

Migaku Takahashi "Control of Microstructure and Magnetic Properties in Thin Film Disk by an Ultra Clean Sputtering Process" Materials Chemistry and Physics 51 (1997) pp. 15–22.

Migaku Takahashi, et al. "Magnetic Microstructure and Media Noise of Thin Film Media Fabricated under Ultra Clean Sputtering Process" Journal of the Magnetics Society of Japan vol. 21, Supplement, No.S2 (1997), pp. 499–504.

* cited by examiner

*Primary Examiner*—Holly Rickman
(74) *Attorney, Agent, or Firm*—Randall J. Knoth

(57) ABSTRACT

A magnetic recording medium having a high coercive force of a ferromagnetic metal layer, a high anisotropic magnetic field and/or normalized coercive force, and adaptable to high density recording. The magnetic recording medium includes a substrate body and a ferromagnetic metal layer containing at least Co and Cr formed thereon via a metallic underlying layer of Cr. Magnetic inversion is utilized for the recording. A first region which penetrates through the ferromagnetic metal layer and in which Cr is segregated are formed among the crystal grains constituting the ferromagnetic metal layer. The Cr concentration in the intermediate portions of the first region in the direction of thickness of the ferromagnetic metal layer is smaller than that of the portions near the surface and near the metallic underlying layer. The crystal grains of the ferromagnetic metal layer are constituted by a second region in which the Cr concentration increases toward the grain boundary and a third region which is formed at the center of the crystalline particle and whose Cr concentration is lower than that near the grain boundary. The maximum Cr concentration in the third region is smaller than the maximum Cr concentration in the second region.

8 Claims, 17 Drawing Sheets

Co₇₉Cr₁₇Ta₄ (28nm)/Cr (50nm)

(a) UC Process 20 nm

Cr/Co  at % Cr (b)

CoCrTa

Cr (a)

(b)

Co₇₈Cr₁₇Ta₅ (28nm) / Cr (50nm)

(a) n Process

20nm (b)

CoCrTa

Cr (a)

(b)

Film thickness of Cr underlying layer (nm)

$Co_{78}Cr_{17}Ta_5$ (28nm) / Cr (2.5nm)
UC Process (a)

TEM picture (b)

Cr element distribution image 20 nm $Co_{78}Cr_{17}Ta_5$ (28nm) / Cr (50nm)
n Process (a)

TEM picture (b)

Cr element distribution image  20 nm (a)

(b)

(a)

(b)

(a)

(b)

MAGNETIC RECORDING MEDIUM

BACKGROUND OF THE INVENTION

1. Field of the Invention

The present invention relates to a magnetic recording medium and a production method thereof, and particularly, to a magnetic recording medium whose ferromagnetic metal layer has a high coercive force Hc, a high anisotropic magnetic field $Hk^{grain}$, and a high normalized coercive force ($Hc/Hk^{grain}$). The magnetic recording medium of the present invention can be suitably applied to a hard disk, a floppy disk, a magnetic tape, and the like.

2. Description of the Related Art

As the conventional magnetic recording medium and its production method, the following is known.

FIG. 17 is a schematic view illustrating a hard disk as an example of a magnetic recording medium. In FIG. 17, FIG. 17(a) is a perspective view of the whole magnetic recording medium, and FIG. 17(b) is a cross section along the A–A' line of FIG. 17(a).

A substrate body 1 consists of an Al substrate 2 and a non-magnetic (Ni—P) layer 3 provided on a surface of the Al substrate 2. On this substrate body, are laminated a Cr underlying layer 4, a ferromagnetic metal layer 5, and a protective layer 6.

The non-magnetic (Ni—P) layer 3 is formed by plating or sputtering, on the surface of the disk-shaped Al substrate 2 of 89 mm (3.5 inches) in diameter and 1.27 mm (50 mil) in thickness, to form the substrate body 1. Further, on the surface of the non-magnetic (Ni—P) layer 3, are provided concentric scratches (hereinafter, referred to as texture) by a mechanical grinding process. Generally, surface roughness of the non-magnetic (Ni—P) layer 3, i.e., a center line average height Ra is in the radial direction 5 nm to 15 nm.

Further, the Cr underlying layer 4 and the ferromagnetic metal layer 5 (generally, a magnetic film of Co alloy family) are formed on the surface of the above-mentioned substrate body 1 by sputtering, and, lastly, the protective layer 6 comprising carbon and the like is formed by sputtering to protect the surface of the ferromagnetic metal layer 5. Typical thicknesses of respective layers are 5 $\mu$m to 15 $\mu$m for the non-magnetic (Ni—P) layer 3, 50 nm to 150 nm for the Cr underlying layer 4, 30 nm to 100 nm for the ferromagnetic metal layer 5, and 20 nm to 50 nm for the protective layer 6.

The conventional magnetic recording medium having the above-described layer structure has been manufactured under the condition that back pressure of the deposition chamber is at the level of $10^{-7}$ Torr before the sputter deposition and impurity concentration of Ar gas used for film formation is 1 ppm or more.

In the magnetic recording medium obtained by the above-described manufacturing method, and particularly in the case of a ferromagnetic metal layer 5 containing Ta element (for example, CoCrTa alloy magnetic film), it is reported by Nakai et al. that, between crystal grains forming the ferromagnetic metal layer, exists a grain boundary layer of amorphous structure, and that this grain boundary layer has a non-magnetic alloy composition (J. Nakai, E. Kusumoto, M. Kuwabara, T. Miyamoto, M. R. Visokay, K. Yoshikawa, and K. Itayama, "Relation Between Microstructure of Grain Boundary and the Integranular Exchange in CoCrTa Thin Film for Longitudinal Recording Media", IEEE Trans. Magn., vol. 30, No. 6, pp. 3969, 1994). However, in the case of a ferromagnetic metal layer that does not contain Ta element (for example, CoNiCr or CoCrPt alloy magnetic film), the above-mentioned grain boundary layer has not been found. Further, the above report describes that, when a ferromagnetic layer contains Ta element, a normalized coercive force (expressed as $Hc/Hk^{grain}$) of the magnetic recording medium is as large as 0.3 or more, and when a ferromagnetic metal layer does not contain Ta element, its value is less than 0.3.

The above-mentioned normalized coercive force ($Hc/Hk^{grain}$) of the ferromagnetic metal layer is a value obtained by dividing a coercive force Hc by an anisotropic magnetic field $Hk^{grain}$ of a crystal grain, and expresses degree of increase of magnetic isolation of the crystal grain. Namely, when normalized coercive force of a ferromagnetic metal layer is high, it means that magnetic interaction between respective crystal grains constituting the ferromagnetic metal layer decreases, and high coercive force can be realized.

Further, an international patent application PCT/JP94/01184 discloses a technique relating to a cheap high-density recording medium whose coercive force is increased without using an expensive ferromagnetic metal layer, and its manufacturing method. According to PCT/JP94/01184, regarding a magnetic recording medium which has a ferromagnetic metal layer formed on a surface of a substrate body via a metal underlying layer and utilizes magnetic reversal, Ar gas whose impurity concentration is 10 ppb or less is used for film formation, so that oxygen concentration of the metal underlying layer and/or ferromagnetic metal layer is made 100 wtppm or less. Further, it is also reported that, the coercive force is further increased when Ar gas of 10 ppb or less impurity concentration is used in a cleaning process by high frequency sputtering on the surface of the above-mentioned substrate body to remove the surface of the substrate body by 0.2 nm to 1 nm, before forming the above-mentioned metal underlying layer. Further, in this report, it is described that there is a correlation between a normalized coercive force of a magnetic recording medium and its medium noise, and, in order to obtain a low noise medium, its normalized coercive force should be more than or equal to 0.3 and less than 0.5.

Further, an international patent application PCT/JP95/00380 discloses a magnetic recording medium and its manufacturing method, in which, when oxygen concentration of a ferromagnetic metal layer consisting of CoNiCr or CoCrPt is 100 wtppm or less, a grain boundary layer of amorphous structure can be formed between crystal grains constituting the ferromagnetic metal layer, and, as a result, a signal-to-noise ratio of electromagnetic transduction characteristics is high, and a stable coercive force can be obtained in mass production.

However, it is still obscure how various magnetic characteristics (coercive force: Hc, anisotropic magnetic field: $Hk^{grain}$, and normalized coercive force: $Hc/Hk^{grain}$) of a ferromagnetic metal layer or to composition distribution in a grain boundary layer of amorphous structure existing between the crystal grains constituting the ferromagnetic metal layer as high values in all the coercive force, anisotropic magnetic field and normalized coercive force, and which is adaptable to promotion of high recording density.

An object of the present invention is to provide a magnetic recording medium whose ferromagnetic metal layer has high coercive force, high anisotropic magnetic field and/or high normalized coercive force, so that it is adaptable to promotion of high recording density.

SUMMARY OF THE INVENTION

A magnetic recording medium of the present invention comprises a ferromagnetic metal layer that contains at least Co and Cr, and is formed on a base body via a metal underlying layer having Cr as its main component, and is characterized in that, the surface roughness of the base body is less than 1 nm when measured as a center line average height Ra, and, between crystal grains constituting the ferromagnetic metal layer, the magnetic recording medium has a first region in which Cr segregates, the first region penetrating the ferromagnetic metal layer, and that, in the first region, Cr concentration is lower in the neighborhood of the middle in the thicknesswise direction of the ferromagnetic metal layer than in the neighborhood of the surface and in the neighborhood of the metal underlying layer.

Film formation is performed under extra clean atmosphere to form a magnetic recording medium comprising a ferromagnetic metal layer which contains at least Co and Cr and is formed on a base body via a metal underlying layer containing Cr as its main component. Surface roughness of the base body is less than 1 nm when measured as a center line average heigh Ra. In that case, there is obtained the magnetic recording medium having a high coercive force, high anisotropic magnetic field and/or high normalized coercive force without depending on film thickness of the metal underlayer containing the main component Cr, by employing such construction that a first region in which Cr segregated and which penetrates the ferromagnetic metal layer exists between crystal grains constituting the ferromagnetic metal layer and, in that first region, Cr concentration is lower in the neighborhood of the middle in the thicknesswise direction than in the neighborhood of the surface and in the neighborhood of the metal underlying layer. In particular, even if the film thickness of the metal underlying layer is 10 nm or less, this effect can be maintained, and accordingly, it is possible to construct a magnetic recording medium which has a small surface roughness and can also be adaptable to lowering of the flying height of a head.

Further, in the above characteristics, a crystal grain of the ferromagnetic metal layer consists of a second region in which Cr concentration increases toward the grain boundary and, in the central part of the crystal grain, a third region in which Cr concentration is lower than the neighborhood of the grain boundary. The maximum Cr concentration in the third region is smaller than the maximum Cr concentration in the second region, and it is possible to obtain a magnetic recording medium which has a higher coercive force than the conventional magnetic recording medium which does not have the third region.

Further, in the above characteristics, when the maximum Cr concentration in the above-mentioned third region is less than or equal to 0.75 times the maximum Cr concentration in the above-mentioned second region, it is possible to obtain a magnetic recording medium which has high and stable values in all the magnetic characteristics (i.e., coercive force, anisotropic magnetic field, and normalized coercive force). This effect can be obtained even with the Cr underlying layer having such an ultrathin thickness as 2.5 nm.

Further, in the above characteristics, when Cr concentration gradient in the above-mentioned second region is 4 at % or more, it is possible to obtain a magnetic recording medium having superior magnetic characteristics in comparison with the conventional magnetic recording medium in which an average of Cr concentration gradient is less than 4 at %.

Although the layer structure of the magnetic recording medium according to the present invention is same as the layer structure of the conventional medium shown in FIG. 17, the ferromagnetic metal layer constituting the magnetic recording medium of the present invention differs from the conventional medium in the following two points.

1. Between the crystal grains constituting the ferromagnetic metal layer, there is a first region in which Cr segregates and which penetrates the ferromagnetic metal layer, and, in the first region, Cr concentration is lower in the neighborhood of the middle in the thicknesswise direction of the ferromagnetic metal layer than in the neighborhood of the surface and in the neighborhood of the metal underlying layer.

2. A crystal grain of the ferromagnetic metal layer consists of the second region in which Cr concentration increases toward the grain boundary and the third region in the central part of the crystal grain, in which Cr concentration is lower than the neighborhood of the grain boundary, and the maximum Cr concentration in the third region is lower than the maximum Cr concentration in the second region.

In the following, embodiment examples of the present invention will be described referring to the drawings.

Substrate Body

As the substrate body in the present invention, are listed aluminum, titanium and its alloys, silicon, glass, carbon, ceramics, plastic, and resin and its complexes, or these material may be used being processed on their surfaces to be provided with surface coating of a non-magnetic film of different material, by means of sputter technique, evaporation method, plating, or the like. It is preferable that the non-magnetic film provided on the surface of this substrate body is not magnetized at high temperature, is electrically conductive and easy to machine, and, on the their hand, has appropriate surface hardness. As a non-magnetic film satisfying such requirements, an (Ni—P) film formed by sputter technique is particularly preferable.

With regard to a shape of the substrate body, when it is to be used as a disk, a doughnut-shape disk is employed. A substrate body provided with a below-mentioned magnetic layer etc., namely, a magnetic recording medium is used being rotated at a speed of, for example, 3600 rpm about a center of the disk as an axis of rotation, at the time of magnetic recording and reproduction. At that time, a magnetic head flies at a height of about 0.1 $\mu$m over the magnetic recording medium. Accordingly, with regard to the substrate body, surface flatness, parallelism of both top and under surfaces, waving in the circumferential direction of the substrate body, and surface roughness should be suitably controlled.

Further, when the substrate body starts or stops rotating, the surfaces of the magnetic recording medium and magnetic head contact with and slide on each other (referred to as Contact Start Stop, CSS). As a measure against this, concentric slight scratches (texture) may be provided on the surface of the substrate body.

Metal Underlying Layer

As the metal underlying layer in the present invention, are listed Cr and its alloys, for example. When alloy is used, combination with V, Nb, Ta, or the like is proposed. In particular, Cr is preferable, since it causes segregation action of a below-mentioned ferromagnetic metal layer. It is used frequently in mass production, and, as the method of the film formation, sputter technique, evaporation method, or the like is employed.

The role of this metal underlying layer is to promote crystal growth of the ferromagnetic metal layer in such a manner that the axis of easy magnetization of the ferromagnetic metal layer lies in an in-plane direction in the substrate body, or, in other words, in such a manner that a coercive force in an in-plane direction in the substrate body becomes large, when the Co-based ferromagnetic metal layer is formed on the metal underlying layer.

When the metal underlying layer comprising Cr is formed by sputter technique, as film formation factors that control its crystalline properties, are listed a surface shape, surface state or surface temperature of the substrate body, gas pressure at the time of film formation, bias applied to the substrate body film thickness to be realized, and the like. In particular, a coercive force of the ferromagnetic metal layer tends to be higher in proportion to the film thickness of Cr, and, accordingly, the conventional film thickness of Cr is selected in the range of 50 nm to 150 nm, for example.

Here, the film formation conditions of the conventional technique [present invention] imply that back pressure of the deposition chamber is at the level of $10^{-7}$ Torr [at the level of $10^{-9}$ Torr], Ar gas used for film formation is normal-Ar (impurity concentration is 1 ppm or more) [uc-Ar(impurity concentration is 100 ppt or less, and preferably 10 ppb or less)]. Further, a target used in forming the metal underlying layer and ferromagnetic metal layer is preferably 150 ppm or less.

To improve the recording density, it is necessary to lower the flying height of the magnetic head from the surface of the medium. On the other hand, when the above-mentioned thickness of the Cr film is larger, surface roughness of the medium becomes larger also. Accordingly, it is desired to realize a high coercive force with thinner Cr film thickness.

Ferromagnetic Metal Layer

As the ferromagnetic metal layer in the present invention, preferable is material that generates Cr segregation between crystal grains of the ferromagnetic metal layer. Namely, a ferromagnetic metal layer containing at least Co and Cr is used frequently. To give examples, CoNiCr, CoCrTa, CoCrPt, CoNiPt, CoNiCrTa, CoCrPtTa etc. are mentioned.

In the present invention, by forming a metal underlying layer and ferromagnetic layer under ultra clean atmosphere, which is cleaner than the conventional film formation conditions, the following two structures are realized.

1. Between the crystal grains constituting the ferromagnetic metal layer, there is the first region in which Cr segregates and which penetrates the ferromagnetic metal layer, and, in the first region, Cr concentration is lower in the neighborhood of the middle in the thicknesswise direction of the ferromagnetic metal layer than in the neighborhood of the metal underlying layer.

2. A crystal grain of the ferromagnetic metal layer consists of the second region in which Cr concentration increases toward the grain boundary and, in the central part of the crystal grain, the third region in which Cr concentration is lower than the neighborhood of the grain boundary, and the maximum Cr concentration in the third region is lower than the maximum Cr concentration in the second region.

Here, the film formation conditions under ultra clean atmosphere in the present invention [conventional film formation conditions] implies that back pressure of the deposition chamber is at the level of $10^{-9}$ [$10^{-7}$] Torr, and impurity concentration of Ar gas used in the film formation is 100 ppt or less and preferably 10 ppb or less [1 ppm or more]. Further, the target used in forming the ferromagnetic metal layer is preferably 30 ppm or less in its impurity concentration.

Among the above-mentioned materials, favorably used materials are CoNiCr, which is inexpensive and less susceptible to a film formation atmosphere, and CoPt type, which is used to realize a coercive force of 1800 Oe or more that is difficult in the cases of CoNiCr and CoCrTa.

A problem to be solved in the above-mentioned materials is to develop material and a manufacturing method that are cheap in the material cost and low in medium noise, and can realize a high coercive force, to improve recording density and to decrease production cost.

Realization of High Recording Density in the Magnetic Recording Medium

The magnetic recording medium in the present invention refers to a medium (in-plane magnetic recording medium) in which recording magnetization is realized in parallel with the film surface of the above-mentioned ferromagnetic metal layer. In such a medium, it is necessary to further miniaturize recording magnetization in order to improve recording density. This miniaturization reduces leakage flux of each recording magnetization, and thus reduces output of regenerative signal at the magnetic head. Accordingly, it is desired to further reduce medium noise, which is considered as effect of adjacent recording magnetization.

Coercive Force: Hc, Anisotropic Magnetic Field: $Hk^{grain}$, and Normalized Coercive Force: $Hc/Hk^{grain}$ of the Ferromagnetic Metal Layer In the present invention, "coercive force of the ferromagnetic metal layer: Hc" implies a coercive force of the medium, obtained from a magnetization curve which is, in turn, measured using a variable sample magnetometer (referred to as VSM). "Anisotropic magnetic field of a crystal grain: $Hk^{grain}$" is an applied magnetic field in which rotational hysteresis loss measured by a high sensitive torque magnetometer completely disappears. Both coercive force and anisotropic magnetic field are values measured in a plane of a thin film, in the case of the magnetic recording medium in which the ferromagnetic metal layer is formed on the surface of the substrate body via the metal underlying layer.

Further, "normalized coercive force of the ferromagnetic metal layer: $Hc/Hk^{grain}$" is a value obtained by dividing the coercive force Hc by the anisotropic magnetic field of a crystal grain $Hk^{grain}$, expressing degree of increase in magnetic isolation of the crystal grain, which is described in "Magnetization Reversal Mechanism Evaluated by Rotational Hysteresis Loss Analysis for the Thin Film Media", Migaku Takahashi, T. Shimatsu, M. Suekane, M. Miyamura, K. Yamaguchi, and H. Yamasaki: IEEE TRANSACTIONS ON MAGNETICS, VOL. 28, 1992, PP. 3285.

Normalized coercive force of the ferromagnetic metal layer formed by the conventional sputter technique is less than 0.35, as far as the ferromagnetic metal layer is Co-based. According to Stoner-Wohlfarth theory, it is shown that, when crystal grains are completely magnetically isolated, normalized coercive force becomes 0.5, and this value is the upper limit of normalized coercive force.

Further, J.-G. Zhu and H. N. Bertram: Journal of Applied Physics, VOL. 63, 1988, pp. 3248 describes that, when normalized coercive force of a ferromagnetic metal layer is higher, magnetic interaction of crystal grains becomes lower, and high coercive force can be realized.

Sputter Technique

As the sputter technique employed in the present invention, are listed, for example, a transfer type in which a thin film is formed while a substrate body moves in front of a target, and a static type in which a thin film is formed while a substrate body is fixed in front of a target. The former is favorable for manufacturing a low cost medium owing to its mass-productivity, and the latter can be employed for manufacturing a medium superior in record and reproduction performance since it is stable in incident angles of sputtered particles on a substrate body.

Sequential Forming of the Metal Underlying Layer and the Ferromagnetic Metal Layer "Sequential forming of the metal underlying layer and the ferromagnetic metal layer" in the present invention implies "after the metal underlying layer is formed on the surface of the substrate body, it is not exposed to pressure atmosphere with higher pressure than the gas pressure at the time of film formation, before the ferromagnetic metal layer is formed on its surface". It is publicly known that, if the surface of the metal underlying layer is exposed to the atmosphere, and thereafter, the ferromagnetic metal layer is formed on it, coercive force of the medium falls remarkably (for example, no exposure: 1500 Oe→exposure: 500 Oe or less)

Impurity and its Concentration in Ar Gas Used for Film Formation

As "impurity in Ar gas used for film formation" in the present invention, are listed $H_2O$, $O_2$, $CO_2$, $H_2$, $N_2$, $C_xH_y$, H, C, O, CO, and the like. In particular, $H_2O$, $O_2$, $CO_2$, O, and CO are, presumedly, impurities that affect quantity of oxygen taken into the film. Accordingly, impurity concentration in the present invention is expressed by the sum of $H_2O$, $O_2$, $CO_2$, O, and CO contained in Ar gas used for film formation.

Cleaning Process by High Frequency Sputtering

As "cleaning process by high frequency sputtering" in the present invention, is mentioned, for example, a method comprising applying AC voltage from RF (radio frequency, 13.56 MHz) power source to a substrate body placed within a space of electrically dischargeable gas pressure. This method is characterized by its applicability to a non-conductive substrate body. Generally, as effect of the cleaning process, is mentioned improvement in adherence of a thin film to a substrate body. After the cleaning process, however, there are many ambiguities in quality of a thin film itself formed on a substrate body.

Impurity and its Concentration in a Cr Target used in Forming the Metal Underlying Layer As "impurity in a Cr target used in forming the metal underlying layer", are listed, for example, Fe, Si, Al, C, O, N, H and the like. In particular, it is conjectured that O is an impurity affecting quantity of oxygen taken into the film. Accordingly, impurity concentration in the present invention refers to oxygen contained in a Cr target used in forming a metal underlying layer.

Impurity and its Concentration in a Target used in Forming the Ferromagnetic Metal Layer As "impurity in a Co-based target used in forming the ferromagnetic metal layer", are mentioned, for example, Fe, Si, Al, C, O, N and the like. In particular, it is conjectured that O is an impurity affecting quantity of oxygen taken into the film. Accordingly, impurity concentration in the present invention refers to oxygen contained in a target used in forming a ferromagnetic metal layer.

Application of Negative Bias to a Substrate Body

"Application of negative bias to a substrate body" in the present invention implies that, when a Cr underlying film or magnetic film is formed to manufacture a magnetic recording medium, DC bias voltage is applied to a substrate body. It is known that, when a suitable bias voltage is applied, coercive force of the medium is increased. It is publicly known that the above-mentioned effect of the bias application is larger when it is applied to both layers than when it is applied only in forming either of layers.

In many times, however, the above-mentioned bias application acts also on objects, i.e., substrate body supporting members and a substrate body holder, in the neighborhood of the substrate body. As a result, gas or dust is generated in a space in the neighborhood of the substrate body, and taken into a thin film being formed. Thus, it tends to cause such an inconvenient state that various film characteristics become unstable.

Further, the bias application to a substrate body gives rise to the following problems:

1. It can not be applied to a non-conductive substrate body such as glass;
2. Saturation magnetic flux density (Ms) of the formed magnetic film is decreased;
3. It is required to provide a complex mechanism inside the deposition chamber; and
4. Degree of applying bias to a substrate body is liable to change, and thus, it tends to cause variation in magnetic characteristics.

Thus, desired is a manufacturing method in which various film characteristics targeted can be obtained without applying the above-mentioned bias.

Ultimate Degree of Vacuum of a Deposition Chamber in which the Metal Underlying Layer and/or the Ferromagnetic Metal Layer is Formed "Ultimate degree of vacuum of a deposition chamber in which the metal underlying layer and/or the ferromagnetic metal layer is formed" in the present invention is one of the film formation factors, affecting a value of coercive force for certain material. In particular, conventionally, it has been considered that, when the above-mentioned ultimate degree of vacuum is low (for example, in the case of $5 \times 10^{-6}$ Torr or more), its effect is large in the case of ferromagnetic metal layer of Co-based material containing Ta In the present invention, however, it is found that, also in the cases of CoNiCr and CoCrPt, i.e., Co- based materials without containing Ta, the ultimate degree of vacuum of a deposition chamber has an effect, when seen from the viewpoint that grain boundary of amorphous structure can be formed or not between crystal grains.

Surface Temperature of the Substrate Body at the Time of Forming The Metal Underlying Layer and/or the Ferromagnetic Metal Layer "Surface temperature of the substrate body at the time of forming the metal underlying layer and/or the ferromagnetic metal layer" is one of the film formation factors, affecting a value of coercive force without depending on material of the ferromagnetic metal layer. Higher coercive force can be realized when film formation is carried out at higher surface temperature as long as it does not damage the substrate body. The damage of the substrate body implies external transformations such as warping, swelling, cracking, and the like, and internal changes such as development of magnetization, increase of quantity of generated gas, and the like.

However, to realize high surface temperature of the substrate body, it is generally necessary to perform heat treatment in the deposition chamber or in a previous chamber. Also, this heat treatment has such inconvenient aspects that gas or dust is generated in a space in the neighborhood of the substrate body, and taken into a thin film being formed, and various film characteristics become unstable.

Further, high surface temperature of the substrate body has following problems:

1. Magnetization of non-magnetic NiP layer is caused in a substrate body of NiP/Al;
2. Strain is caused in the substrate body; and
3. It is difficult to raise or maintain temperature of a substrate body, in the case of a substrate body having low thermal conductivity such as glass. Accordingly, desired is a manufacturing method in which the above mentioned heat treatment is not carried out, or various film characteristics targeted are obtained with lower heat treatment.

Surface Roughness Ra of the Substrate Body

As surface roughness of the substrate body in the present invention is mentioned a center line average height Ra. As a measuring apparatus, is used a TALYSTEP made by RANKTAYLORHOBSON Ltd.

When the substrate body starts to rotate from a stationary state or vice versa, surfaces of the magnetic recording medium and magnetic head contact with and slide on each other (referred to as contact Start Stop, CSS). At that time, to suppress adhesion of the magnetic head or rise in friction coefficient, a larger Ra is favorable. On the other hand, when the substrate body arrives at the maximum rotational speed, it is necessary to ensure spacing between the magnetic recording medium and the magnetic head, i.e., the flying height of the magnetic head, and, accordingly, a smaller Ra is desirable.

Thus, the surface roughness of the substrate body and the maximum and minimum of Ra are suitably decided based on the above-described reasons and required specifications of the magnetic recording medium. For example, in the case that the flying heigh of the magnetic head is 2 μinch, Ra=6 nm–8 nm.

However, to realize much higher recording density, it is necessary to further reduce the flying heigh of the magnetic head (the distance between the magnetic head and the surface of the magnetic recording medium at the times of recording and reproduction). To satisfy this demand, it is important to flatten the surface of the magnetic recording medium furthermore. By reason of this, smaller surface roughness of the substrate body is favorable.

Thus, desired is a manufacturing method in which various film characteristics targeted are obtained even when the surface roughness of the substrate body is smaller.

Texture Processing

As texture processing in the present invention, are listed, for example, a method using mechanical grinding, a method by chemical etching, a method of giving a physical concave and convex film and the like. In particular, in the case of a substrate body of aluminum alloy that is used most widely, the method using mechanical grinding is employed. For example, with regard to an (Ni—P) film provided on a surface of a substrate body of aluminum alloy, there is a method in which a tape to which abrasive grains for grinding are adhered is pressed against the rotating substrate body so that concentric slight scratches are given to the substrate body. In this method, the abrasive grains for grinding are sometimes used being separated from the tape.

However, because of the reasons described in the above section of "Surface roughness of the substrate body", desired is a method in which the above-mentioned texture processing is not carried out, or a method in which various f&n characteristics targeted are obtained with a slighter texture pattern.

Composite Electrolytic Polishing Processing

As composite electrolytic polishing processing in the present invention, is mentioned, for example, processing of providing an oxidized passive film by producing chromium oxide as product material on an inner wall of a vacuum chamber that is used in forming a magnetic film or the like. In that case, as the material constituting the inner wall of the vacuum chamber, preferable is, for example, SUS316L or the like. This processing can reduce quantities of $O_2$ and $H_2O$ emitted from the inner wall of the vacuum chamber, and thus, it is possible to further reduce quantity of oxygen taken into the formed thin film.

The present invention has used a magnetron sputtering system (model number ILC3013: load-lock static facing type) made by Anelva Co., Ltd., in which, the above-described processing is carried out on inner walls of all vacuum chambers (a charging/discharging chamber, a deposition chamber, and a cleaning chamber).

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
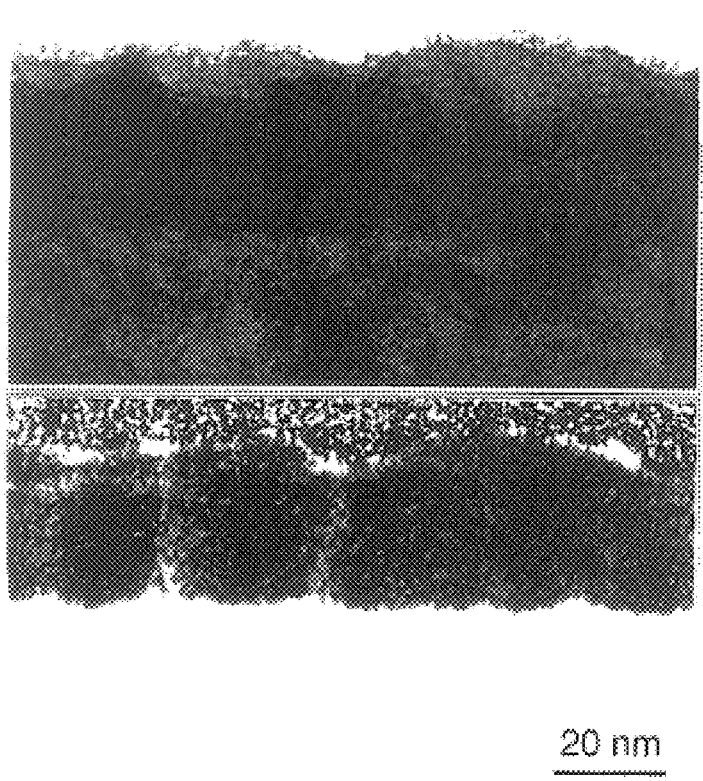
FIG. 1(a) shows, in its lower part, a Cr element distribution image in a thin film cross section of a UC process medium, and, in its upper part, a cross-sectional TEM picture in the same range of vision.
FIG. 1(b) is a schematic view showing a shape of a Cr segregation layer.
Figure 1:
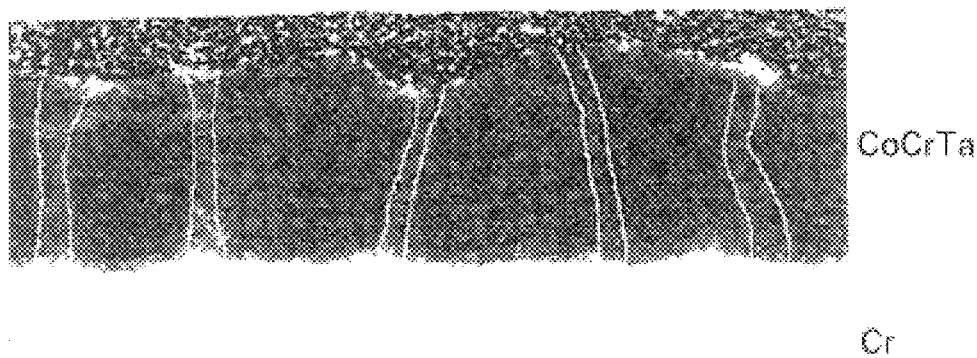

Symbols 1 substrate body
2 substrate
3 non-magnetic layer
4 underlaying layer
5 ferromagnetic metal layer
6 protective layer Embodiment 1

The present embodiment shows effect in the case that "between crystal grains constituting a ferromagnetic metal layer, is a first region in which Cr segregates and which penetrates the ferromagnetic metal layer, and the first region is lower in Cr concentration in the neighborhood of the middle in the thicknesswise direction of the ferromagnetic metal layer than in the neighborhood of metal underlying layer."

To identify the effect, are changed ultimate degree of vacuum of a deposition chamber, in which the metal underlying layer and the ferromagnetic metal layer are formed, and impurity concentration of Ar gas used in film formation of these layers.

As the ultimate degree of vacuum of the deposition chamber in which the metal underlaying layer and the ferromagnetic metal layer are formed, levels of $10^{-9}$ Torr and $10^{-7}$ Torr are selected.

As Ar gas used for forming the ferromagnetic metal layer and the metal underlying layer, are used uc-Ar (impurity concentration of 1 ppb or less) when the ultimate degree of vacuum is at the level of $10^{-9}$ Torr, and normal-Ar (impurity concentration of about 1 ppm) when the ultimate degree of vacuum is at the level of $10^{-9}$ Torr.

In the following, a UC process refers to the case in which the ultimate degree of vacuum is at the level of $10^{-9}$ Torr and uc-Ar gas is used, and an n process refers to the case in which the ultimate degree of vacuum is at the level of $10^{-7}$ torr and normal-Ar gas is used.

In the present embodiment, a sputtering system used for manufacturing a medium is the magnetron sputtering system (model number ILC3013: load-lock static facing type) made by Anelva Co., Ltd., in which composite electrolytic polishing processing is performed on the inner walls of all the vacuum chambers (a charging/discharging chamber (also serving as cleaning room), a deposition chamber 1 (forming the metal underlying layer), a deposition chamber 2 (forming the ferromagnetic metal layer), a deposition chamber 3 (forming the protective layer)). Table 1 shows conditions of film formation in manufacturing the magnetic recording medium of the present embodiment.

TABLE 1

| Items | Set Value |
|---|---|
| (1) material of the substrate body | Al—Mg alloy (Plated with (Ni—P) film having film thickness of 10 μm) |
| (2) diameter and shape of the substrate body | 89 mm, disk shape |
| (3) surface shape of the substrate body | with texture, Ra < 1 nm |
| (4) ultimate degree of vacuum (Torr) | $10^{-9}$ or $10^{-7}$ (same for all chambers) |
| (5) impurity concentration of Ar gas | 1 ppb or less or about 1 ppm (same for all chambers) |
| (6) pressure of Ar gas (mTorr) | 2(Cr),3(CoCrTa) |
| (7) retention temperature of the substrate body surface (° C.) | 250 (same for all chambers) |
| (8) target material (at %) | Cr,Co$_{78}$Cr$_{17}$Ta$_5$ |
| (9) diameter of the target (inch) | 6 |
| (10) impurity concentration of the target (ppm) | 120(Cr),20(CoCrTa) |

TABLE 1-continued

| Items | Set Value |
| --- | --- |
| (11) distance between the target and the substrate body (mm) | 35 (Cr,CoCrTa) |
| (12) power input to the target (W) | DC 200(Cr,CoCrTa) |
| (13) DC bias applied to the substrate body at the time of film formation (-Volt) | 0 (Cr,CoCrTa) |
| (14) formed film thickness (nm) | 50(Cr),28(CoCrTa) |

In the following, will be described the manufacturing method of the magnetic recording medium of the present embodiment, following the steps of the procedure. In the following, numbers in parentheses indicate those steps. Further, in each step, a value in brackets "[ ]" shows a value in the case that the ultimate degree of vacuum of the deposition chamber in which the metal underlying layer or the ferromagnetic metal layer is formed in put at the level of $10^{-7}$ Torr.

(1) As a substrate body, is used an aluminum alloy substrate of a disk shape having inner/outer diameters of 25 mm/89 mm and a thickness of 1.27 mm. On the surface of the aluminum alloy substrate, is provided a (Ni—P) film with thickness of 10 μm by plating. On the surface of the (Ni—P) film, are provided concentric slight scratches (texture) by a mechanical method. A substrate body having such surface roughness is used that, when scanned in the radial direction of the disk, its center line average height Ra is less than 1 nm.

(2) The above-described substrate body is subjected to a cleaning process by mechanical and chemical methods and a drying process by hot air or the like, before the film formation described below.

(3) The substrate body having finished with the above drying process is set to a substrate body holder of aluminum material arranged in the charging chamber of the sputtering system. The inside of the charging chamber is exhausted to the ultimate degree of vacuum of $3\times10^{-9}$ Torr by a vacuum pumping system, and thereafter, the substrate body is heated at 250° C. for 30 minutes by an infrared lamp.

(4) The above substrate body holder is moved from the charging chamber to the deposition chamber 1 for formation of a Cr film. After the movement, the substrate body is also heated and held at 250° C. by an infrared lamp. On the other hand, the deposition chamber 1 is exhausted to the ultimate degree of vacuum of $3\times10^{-9}$ Torr [$1\times10^{-7}$ Torr] in advance, before using. After the movement of the above base holder, a door valve between the charging chamber and the deposition chamber 1 is closed. A Cr target having impurity concentration of 120 ppm is used.

(5) Ar gas is introduced into the deposition chamber 1 so that the gas pressure of the deposition chamber 1 becomes 2 mTorr. Used Ar gas is 1 ppb or less [about 1 ppm] in its impurity concentration.

(6) Voltage of 200 W is applied to the Cr target from a DC power source to generate plasma. As a result, the Cr target is sputtered and a Cr layer with film thickness of 50 nm is formed on the surface of the substrate body placed in parallel with and facing the target.

(7) After the formation of the Cr layer, the above substrate body holder is moved from the deposition chamber 1 to the deposition chamber 2 for forming a CoCrTa film. After the movement, the substrate body is heated and held at 250° C. by an infrared lamp. On the other hand, the process is carried out in different conditions of the present ultimate degree of vacuum of the deposition chamber 2, namely, in two cases, a case where the chamber 2 has been exhausted to $3\times10^{-9}$ Torr, and a case where the chamber 2 has been exhausted to $1\times10^{-7}$ Torr. Further, after the movement of the above substrate body holder, a door valve between the deposition chamber 1 and the deposition chamber 2 is closed. A target used is constituted of 78 at % of Co, 17 at % of Cr, and 5 at % of Ta, and impurity concentration of the target is 20 ppm.

(8) Ar gas is introduced into the deposition chamber 2 so that the gas pressure of the deposition chamber 2 is 3 mTorr. Impurity concentration of Ar gas used is 1 ppb or less [about 1 ppm].

(9) Voltage 200 W is applied from a DC power source to the CoCrTa target, to generate plasma. As a result, the CoCrTa target is sputtered, and a CoCrTa layer with film thickness of 28 nm is formed on the surface of the substrate body having the Cr layer, which is place din parallel with and facing the target.

(10) After the formation of CoCrTa layer, the above substrate body holder is moved from the deposition chamber 2 to the discharging chamber. Then, $N_2$ gas is introduced to the discharging chamber to achieve the atmospheric pressure, and thereafter, the substrate body is taken out. According to the above processes (1) through (9), there is manufactured a magnetic recording medium whose layer structure is CoCrTa/Cr/NiP/Al.

Here, as the targets, are used ones in which impurities are suppressed to the utmost. Impurities of the target for forming the Cr layer are Fe:88, Si:34, Al:10, C:60, O:120, N:60, and H:1.1 (wt ppm). And, impurities of the target for forming the ferromagnetic metal layer are Fe:27, Si<10, AL<10, C:30, O:20, and N>10 (wt ppm).

A cross section of the ferromagnetic layer of the medium manufactured according to the above-described processes is investigated by a transmission electron microscope (TEM).

Figure 3:
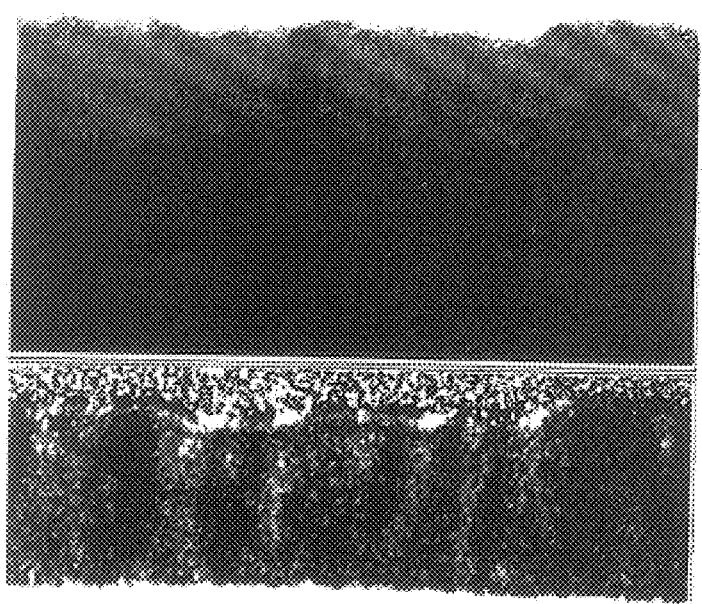
FIG. 3(a) shows, in its lower part, a Cr element distribution image in a thin film cross section in an n process medium, and, in its upper part, a cross-sectional TEM picture in the same range of vision.
FIG. 3(b) is a schematic view showing a shape of a Cr segregation layer.
Figure 3:
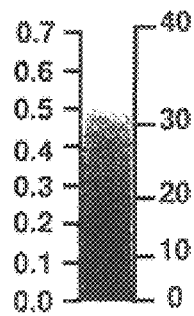
Figure 3:
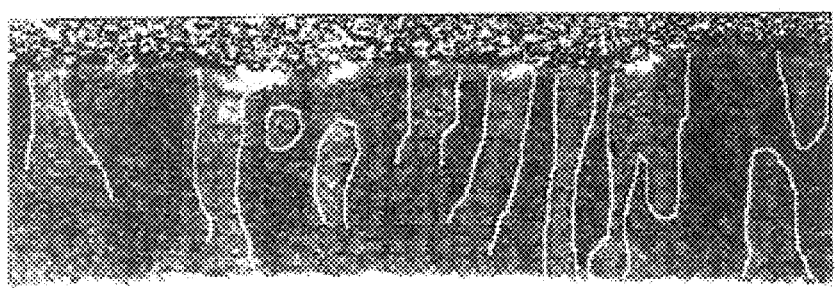

In FIGS. 1 and 3, each of the lower part of FIG. 1(a) and the lower part of FIG. 3(a) shows an image of Cr element distribution in a cross section of a film of the ferromagnetic layer of the medium manufactured. Each of the upper part of FIG. 1(a) and the upper part of FIG. 3(a) shows a cross-sectional TEM picture in the same range of vision. In these figures also, Cr concentration is shown by contrast of black and white. Further, FIGS. 1(b) and 3(b) are schematic views, each showing a Cr segregation region.

FIGS. 1 and 3 show the cases different in the ultimate degree of vacuum before film formation in the deposition chambers 2 and 3. FIG. 1 shows the case of the UC process (sample 1, ultimate degree of vacuum=$3\times10^{-9}$ Torr, impurity concentration of Ar gas used is 1 ppb or less), and FIG. 3 shows the case in the n process (sample 2, ultimate degree of vacuum=$1\times10^{-7}$ Torr, impurity concentration of Ar gas used is about 1 ppm).

Table 2 shows a manufacturing method of a TEM sample and its viewing conditions.

TABLE 2

<Manufacturing method of a sample>

(1) Mechanical grinding process is performed from a non-deposition surface of a sample to obtain sample thickness of 10 μm or less.
(2) Further, ion milling process is performed from the non-deposition surface of the sample TABLE 2-continued to obtain sample thickness of 5 nm or less.
Main processing conditions are: Ar ion beam,
4.5 kV × 4 mA, incident angle 15°.
<Conditions of TEM viewing>

(1) TEM used: HF-2000 made by Hitachi Ltd.
(2) Acceleration voltage: 200 kV

Further, Cr concentration distribution in a manufactured sample is evaluated by electron energy loss spectroscopy (EELS). For measurement, is used an energy filter type TEM which is obtained by combining an FE-TEM made by Hitachi Ltd. (HITACHI HF-2000) with an energy filter. Plane resolution of the present apparatus is about 0.55 nm. An element distribution image evaluated by EELS is a qualitative distribution image. Thus, in the present embodiment, a partial scattering cross section ratio of Cr and Co is obtained from average concentration obtained from measurement of the same sample by an energy dispersive X-ray spectrometer spectroscopy (EDS), and, using that value, quantification of Cr element distribution is performed.

Graphs shown in FIGS. 2(b) and 4(b) are results of Cr concentration owing to the above quantification. Here, FIG. 2(b) is a measurement result in the solid line part of FIG. 2(a) showing a part of the sample 1 (UC process) shown in FIG. 1(b), and FIG. 4(b) is a measurement result in the sold line part of FIG. 4(a) showing a part of the sample 2 (n process) shown in FIG. 3. In the graphs of FIGS. 2(b) and 4(b), the origin is taken at the Cr underlying layer— magnetic layer interface and positions in the film thickness direction are shown in the abscissa.

From FIG. 1, it is clear that, in the case of a medium manufactured by the. UC process (UC process medium), a Cr segregation region exists at a region corresponding to the grain boundary layer on the TEM picture, and a clear Cr segregation region has been formed. Further, it is also found the such a Cr segregation region is formed uniformly from an initial growth layer of the magnetic layer directly on the Cr underlying layer to the upper part of the magnetic layer. Further, a Cr segregation region is not found in a region inside a magnetic crystal grain, and this, very uniform Cr segregation is generated.

On the other hand, from FIG. 3, it is found that, in a medium manufactured by the n process (n process medium), a Cr segregation region does not correspond to a grain boundary layer, and a Cr segregation region is also formed within a magnetic crystal grain. It is considered that such a Cr segregation region within a grain corresponds to a region presenting amorphous structure within the grain, and is a factor of largely decreasing crystallinity of the crystal grain. Further, with regard to Cr segregation in a grain boundary layer, it is found that a Cr segregation region is not formed uniformly in the direction of the film thickness of the magnetic layer, and, in particularly, a Cr segregation region is rarely formed in an initial growth layer of the magnetic layer. Thus, it is found that, in the n process medium, formation of Cr segregation layer is obstructed in the initial layer of the magnetic layer.

From the above results, it becomes clear that the purification of a film formation atmosphere (i.e., the UC process) promotes formation of Cr segregation structure and that Cr segregation regions within grains can be decreased and a uniform Cr segregation layer can be formed in an initial layer of the magnetic layer.

Figure 2:
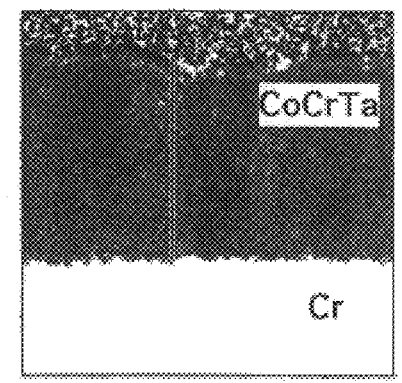
FIG. 2(b) is a graph showing a distribution of Cr concentration in the thicknesswise direction of the Cr segregation layer in the UC process medium.
FIG. 2(a) shows a part of FIG. 1(b), with a solid line indicating a location of measurement of Cr concentration.
Figure 2:
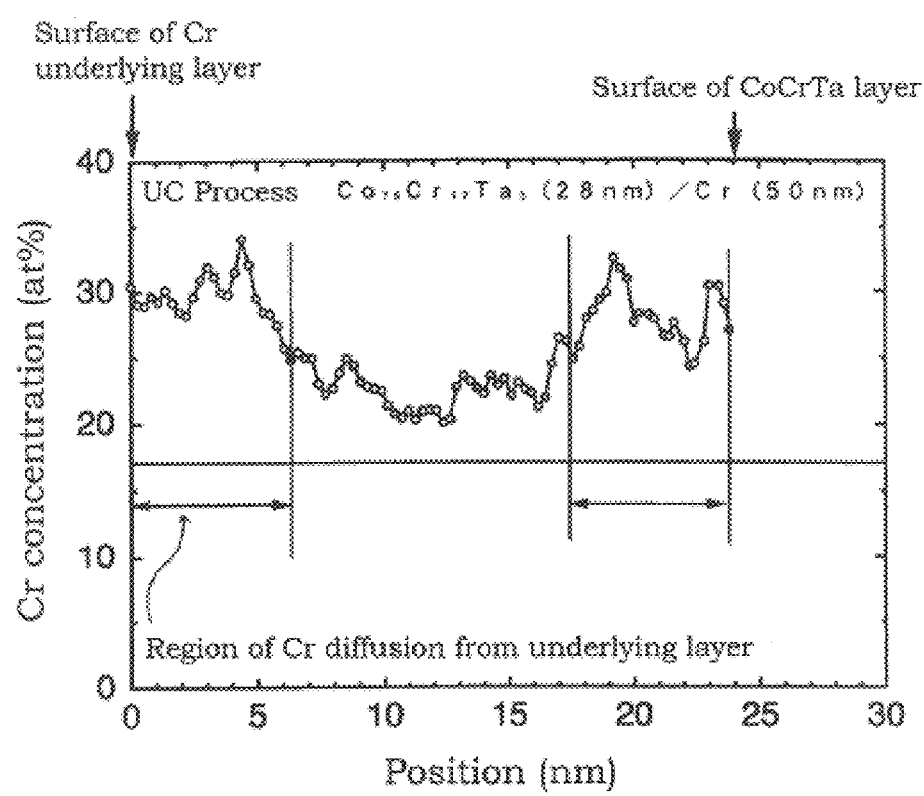

Further, for the graph of FIG. 2, it is found that, in a UC process medium, among Cr segregation layers, regions of especially higher Cr concentration exist in a region of about 6 nm from the Cr underlying layer and in a region of about 6 nm from the surface of the magnetic layer. With regard to such distribution of Cr concentration, it is considered that the region of about 6 nm from the Cr underlying layer indicated grain boundary diffusion of Cr from the Cr underlying layer. Thus, it becomes clear that, in a UC process medium, in addition to disorption of Cr form the inside of a grain to a grain boundary, the grain boundary diffusion from the Cr underlying layer largely contributes to the formation of the Cr segregation layers. Further, it is considered that the higher Cr concentration in the surface portion of the magnetic layer indicates a tendency for Cr to be retained owing to Cr disorption at the time of film formation.

Figure 4:
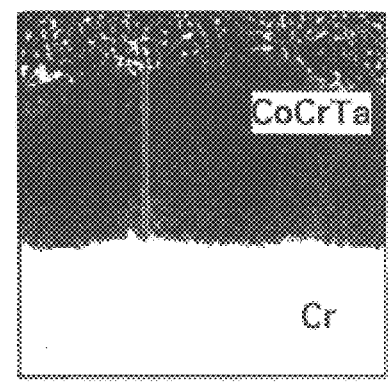
FIG. 4(b) is a graph showing a distribution of Cr concentration in the thicknesswise direction of the Cr segregation layer in the n process medium.
FIG. 4(a) shows a part of FIG. 3(b), with a solid line indicating a location of measurement of Cr concentration.
Figure 4:
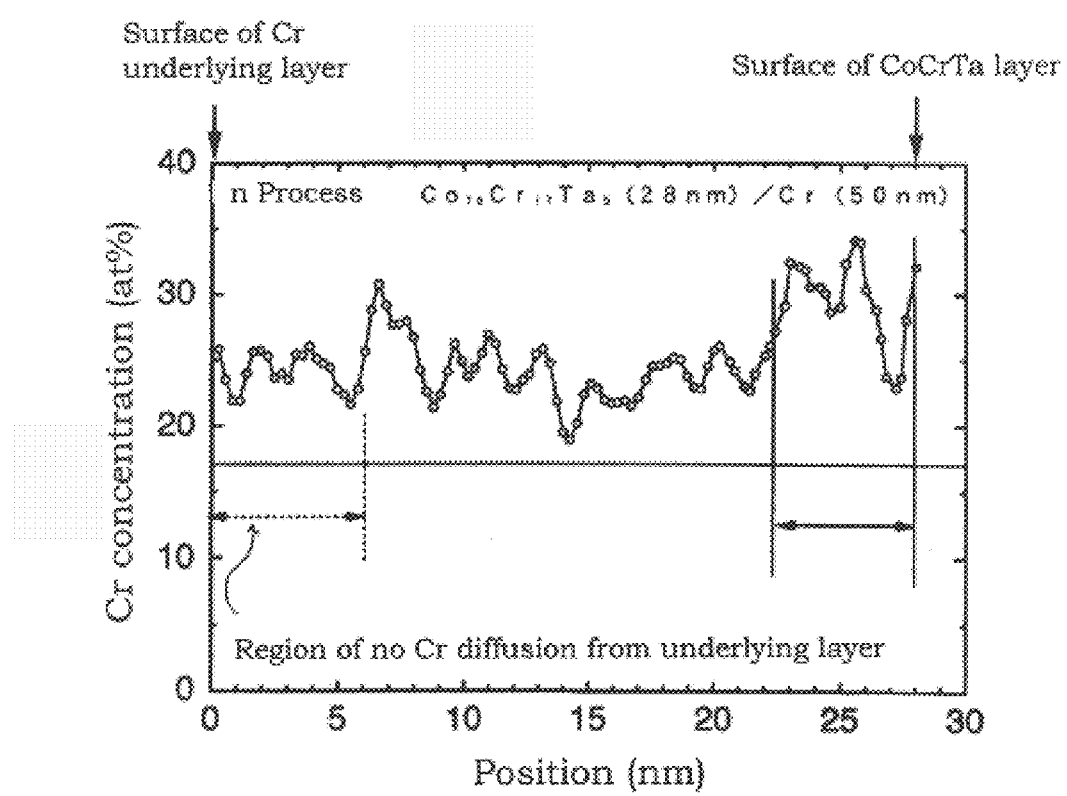

On the other hand, from the graph of FIG. 4, also in an n process medium, a region of higher Cr concentration can be found n the surface portion of the magnetic layer. However, it is found that a region of higher Cr concentration, which exists in a UC process medium, can not be seen. This indicates that, in the case of the n process medium, the grain boundary diffusion of Cr from the Cr underlying layer is obstructed.

From the above results, it becomes clear that purification of a film formation atmosphere (i.e., the UC process) promotes the Cr diffusion from the Cr underlying layer, and contributes to the formation of the Cr segregation layers.

Figure 5:
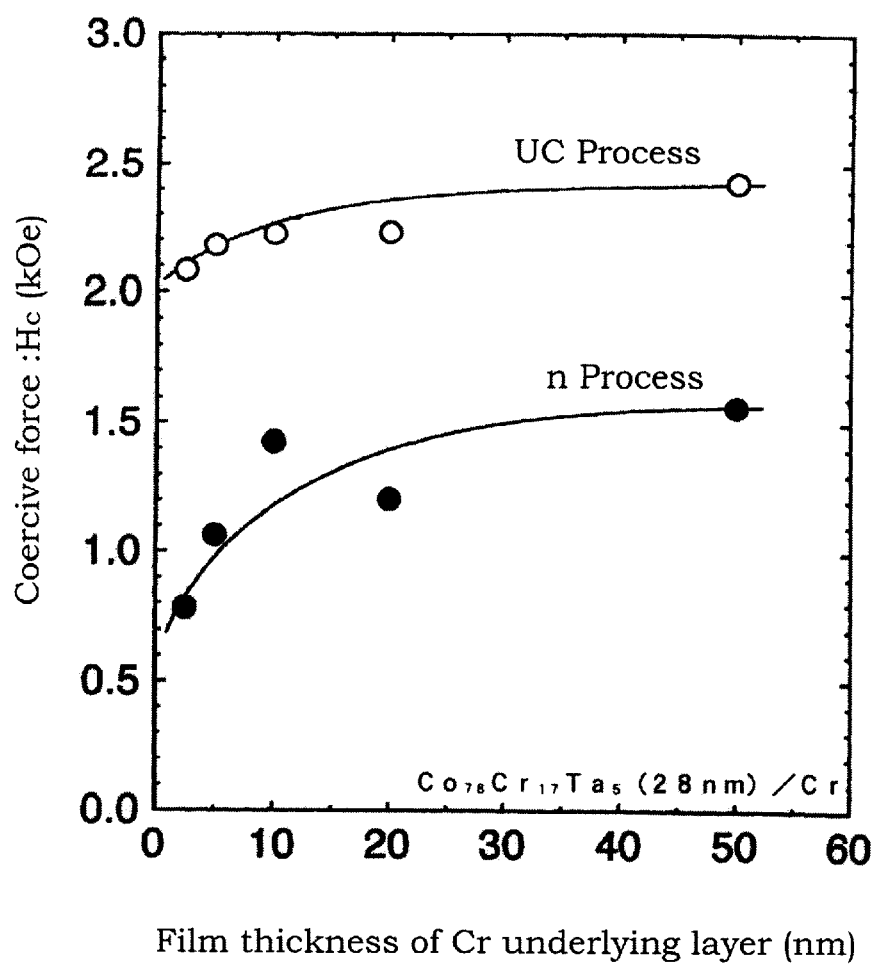
FIG. 5 is a graph showing dependence of coercive force on film thickness of an underlying Cr film, in a UC process medium and n process medium.
Figure 6:
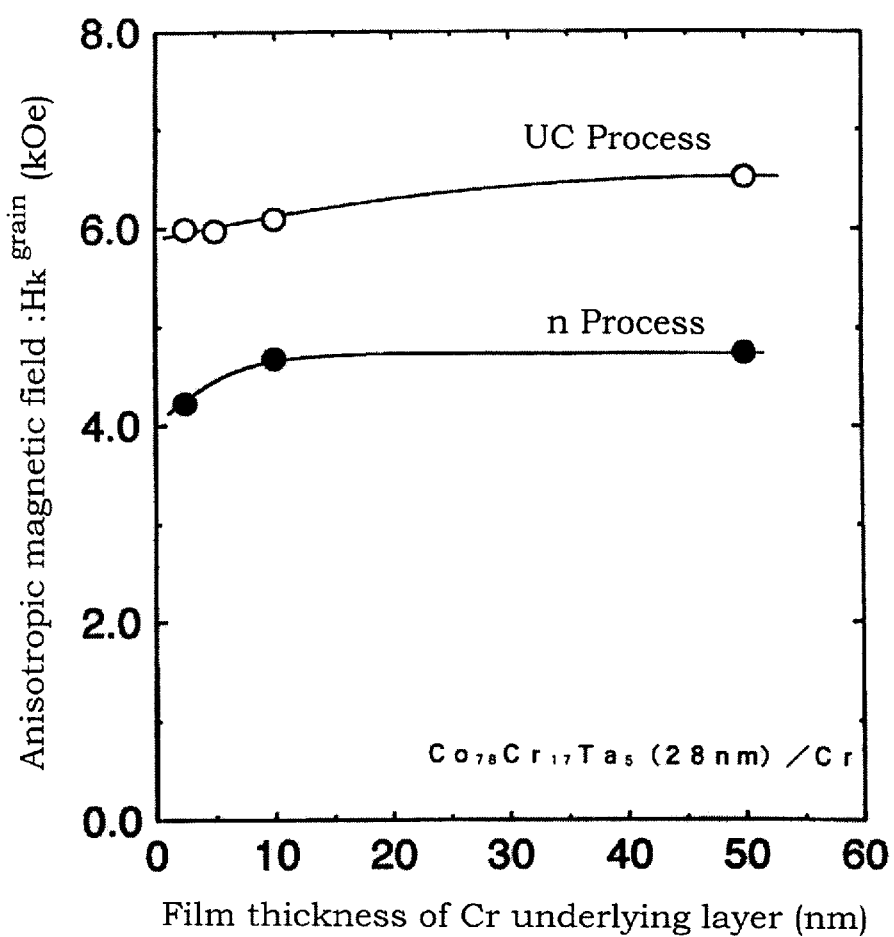
FIG. 6 is a graph showing dependence of anisotropic magnetic field on film thickness of an underlying Cr film, in a UC process medium and n process medium.
Figure 7:
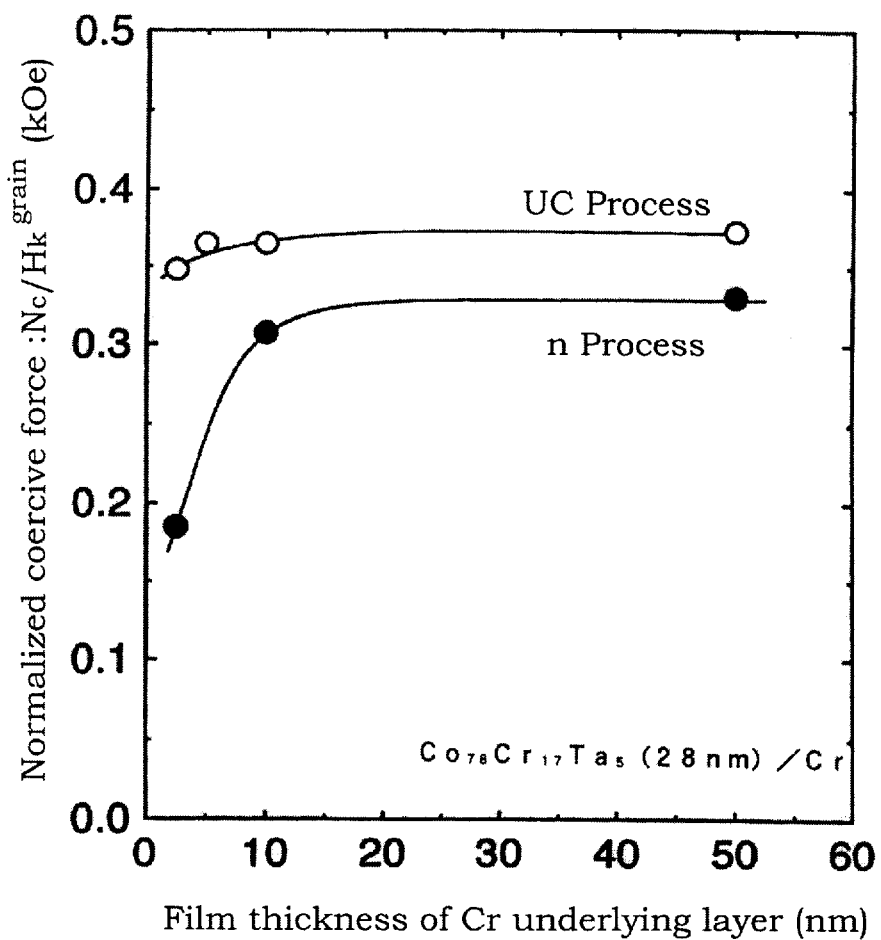
FIG. 7 is a graph showing dependence of normalized coercive force on film thickness of an underlying Cr film.

FIGS. 5 through 7 show resultant magnetic characteristics when a medium is manufactured varying the film thickness of the Cr underlying layer in the range of 2.5 to 50 nm. At that time, film thickness of the magnetic layer is fixed at 20 nm.

FIGS. 5, 6, and 7 show graphs summarizing coercive forces (Hc), anisotropic magnetic fields ($Hk^{grain}$), and normalized coercive forces ($Hc/Hk^{grain}$), respectively. In the graphs of FIGS. 5 through 7, the mark ○ indicates a result of a UC process medium, and the mark ● indicates a result of an n process medium.

From FIGS. 5 through 7, it is found that, in comparison with an n process medium, a UC process medium has higher values in all magnetic characteristics, i.e., a coercive force, an anisotropic magnetic field, and a normalized coercive force, without depending on film thickness of Cr. Further, it becomes clear that, in the case of the UC process medium, an ultrathin Cr underlying layer having thickness of 10 nm or less can maintain superior magnetic characteristics. Further, it is also found that a medium having such an ultrathin Cr underlying layer can suppress its surface roughness by more than half in comparison with a medium using a Cr underlying layer having thickness of about 50 nm, and its surface roughness is at the level reflecting the surface roughness of the substrate body.

Thus, it becomes clear that the UC process medium is superior in varius magnetic characteristics, i.e., its coercive force, anisotropic magnetic field, and normalized coercive force, and, at the same time, it can also sufficiently adaptable to the lowering of flying height of a head.

Embodiment 2

In the present embodiment, will be described effects that are brought when "a crystal grain of the ferromagnetic metal layer consists of the second region in which Cr concentration increases toward the grain boundary, and, in the cental part of the crystal grain, the third region in which Cr concentration is lower than the neighborhood of the grain boundary, and the maximum Cr concentration in the second region."

To identify the effects, the UC process of Embodiment 1 is employed to manufacture media, varying the ultimate degree of vacuum of a deposition chamber in which a metal underlying layer and a ferromagnetic metal layer are formed, in the range of the level of $10^{-6}$ Torr to $10^{-9}$ Torr, and, with regard to these media, two-dimensional Cr element distribution images are observed using EELS. At that time, as Ar gas used for formation of the ferromagnetic metal layer and the metal underlying layer, uc-Ar (impurity concentration: 1 ppb or less) is used as in Embodiment 1. Further, for the purpose of comparison also the n process medium shown in Embodiment 1 is examined.

Other aspects are similar to Embodiment 1.

Figure 8:
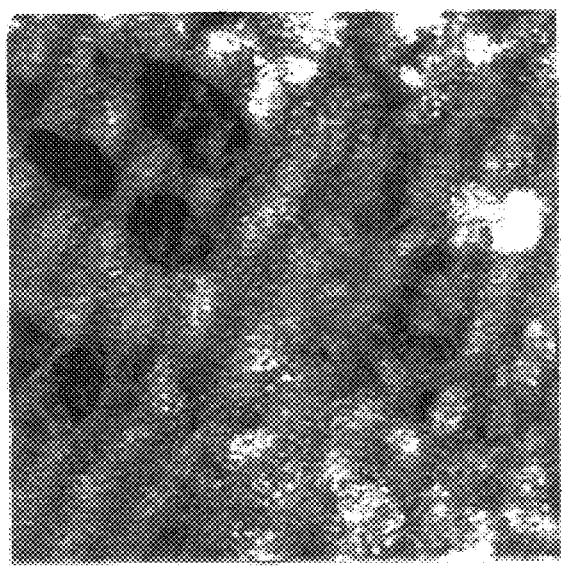
FIG. 8(b) is a distribution image of Cr element on a surface of a thin film in a UC process medium.
FIG. 8(a) is a TEM picture in the same range of vision.
Figure 8:
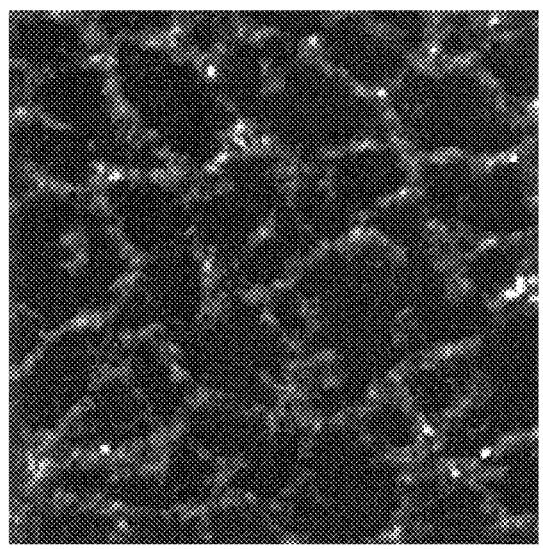
Figure 8:
Figure 9:
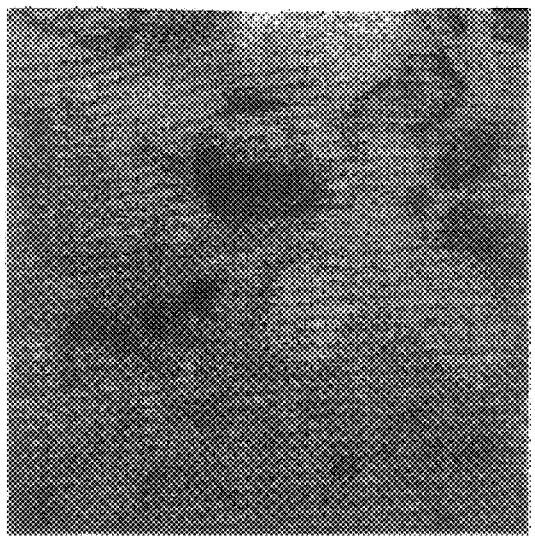
FIG. 9(b) is a distribution image of Cr element on a surface of a thin film in an n process medium.
FIG. 9(a) is a TEM picture in the same range of vision.
Figure 9:
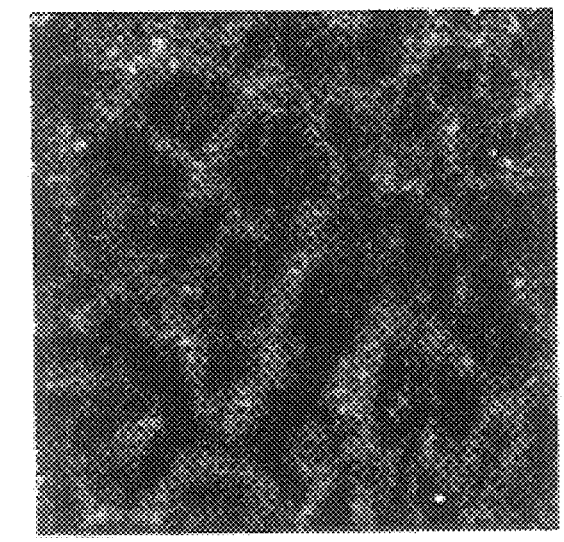
Figure 9:
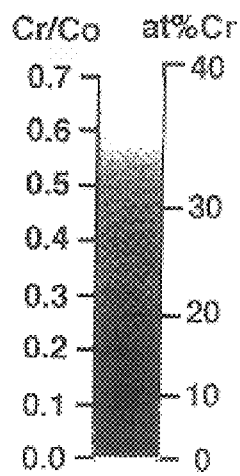

FIGS. 8(b) and 9(b) show results of investigating Cr element distribution images with respect to film surfaces of ferromagnetic metal layers. FIG. 8 shows a result of a UC process medium (in the case of: ultimate degree of vacuum= $1\times10^{-8}$ Torr), and FIG. 9 shows a result of an n process medium.

In the Cr element distribution images of FIGS. 8(b) and 9(b), bright regions in the image contrast shows regions of high Cr concentration. Further, in FIGS. 8(a) and 9(a), TEM pictures in the same ranges of vision are shown together. In the present example, plane resolution of EELS measurement is 0.55 nm corresponding to one pixel of the Cr element distribution images, and this, composition analysis of a very fine region is possible.

From FIG. 8, it becomes clear that, in the UC process medium, a Cr segregation layer having high Cr concentration is formed at a grain boundary portion, to uniformly separate each crystal grain. Further, it is found that Cr concentration in a Cr segregation layer is 30 to 40 at %.

On the other hand, also in the n process medium shown in FIG. 9, it is found that there are regions in which Cr segregation is produced in grain boundary portions and regions in which high Cr segregation is not produced between neighboring crystal grains. However, in the n process medium, Cr segregation layers are not uniform, and it is found from the Cr concentration contrast that Cr concentration in Cr segregation layers is lower in comparison with the UC process medium.

From the above results, it is found that, in the UC process medium, Cr concentration of Cr segregation layers is higher in comparison with the n process medium, and segregation is uniformly produced.

Detailed line profiles are obtained from the Cr element distribution images shown in FIGS. 8(b) and 9(b), and results are shown in FIG. 10(b) (UC process medium: ultimate degree of vacuum= $1\times10^{-8}$ Torr) and in FIG. 11(b) (n process medium). A line profile of Cr concentration is shown as a result obtained along a line segment AB shown in each of FIGS. 10(a) and 11(a). Abscissas of the graphs shown in FIGS. 10(b) and 11(b) show relative positions of analysis points, with the point A being the reference point. Further, regions corresponding to crystal grains in the TEM pictures are shown by half-tone dot meshing in the figures. It if found that, in either of the UC process medium and the n process medium, there are average quantity and variable quantity of Cr concentration within a grain. Further, it is found that there is a difference between the UC process medium and the n process medium in their Cr concentration gradients in a region of 2 to 3 nm from a grain boundary portion to the inside of a grain.

Figure 10:
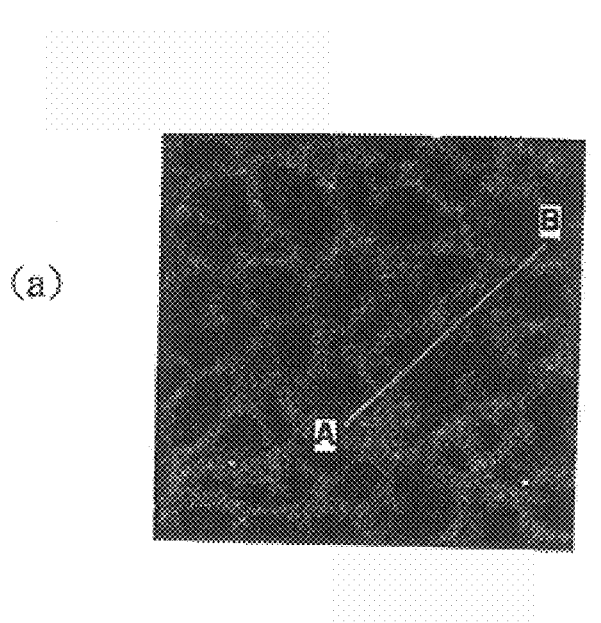
FIG. 10(b) is a graph showing a distribution of Cr concentration on a surface of a thin film in a UC process medium.
FIG. 10(a) is a Cr element distribution image, with a line segment A–B showing a location of measurement of Cr concentration.
Figure 10:
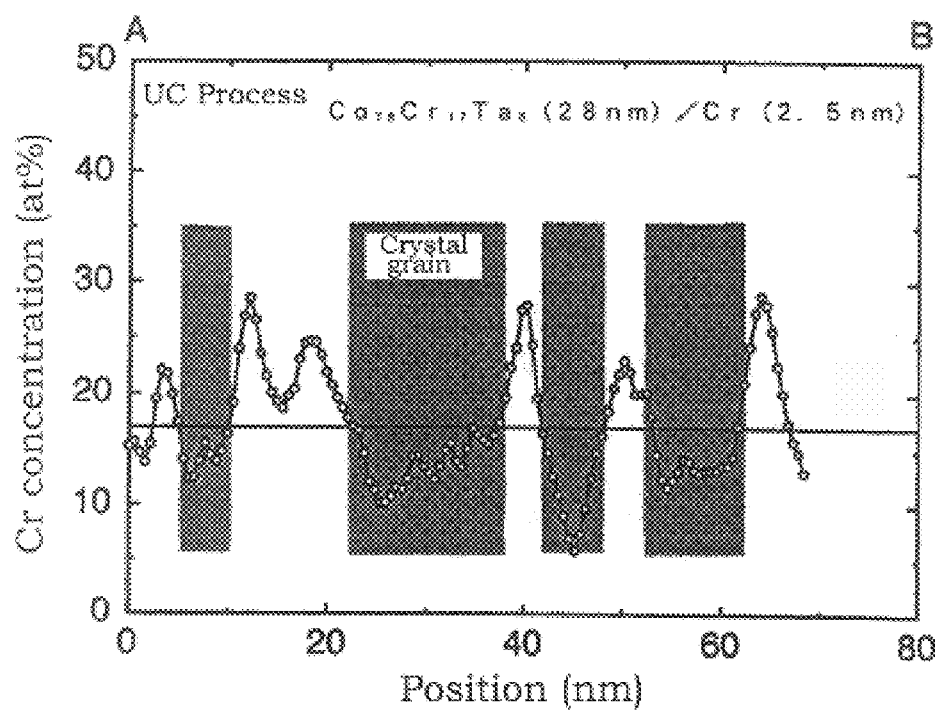

From FIG. 10, in the UC process medium, the maximum Cr concentration in a third region (a region in the central part of a crystal grain of the ferromagnetic metal layer, in which Cr concentration is lower than the neighborhood of the grain boundary) is smaller than the maximum Cr concentration in a second region (a region in which Cr concentration increases toward the grain boundary of a crystal grain of the ferromagnetic metal layer).

Figure 11:
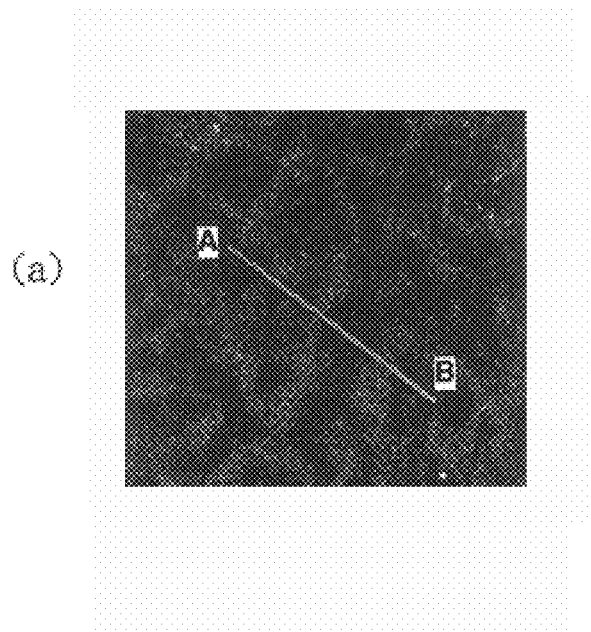
FIG. 11(b) is a graph showing a distribution of Cr concentration on a surface of a thin film in a UC process medium.
FIG. 11(a) is a Cr element distribution image, with a line segment A–B showing a location of measurement of Cr concentration.
Figure 11:
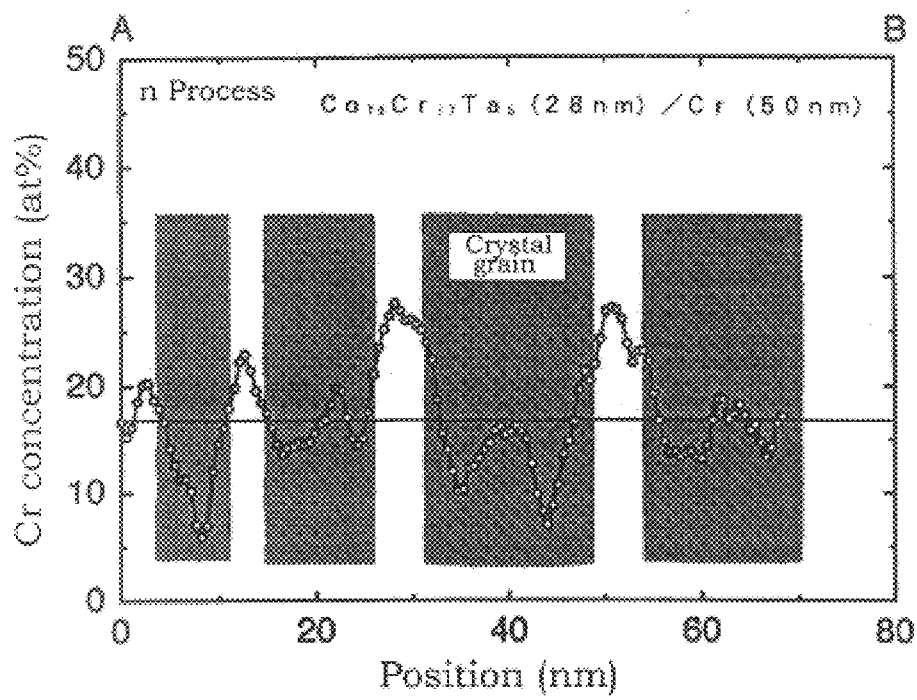

On the other hand, it is seen that, the n process medium shown in FIG. 11 is dotted with grain in which the maximum Cr concentrations in regions 3 are larger than the maximum Cr concentrations in regions 2.

In the following, for these media, detailed description will be given with respect to (1) average quantity and variable quantity of Cr concentration within a grain and (2) Cr concentration gradient in the neighborhood of a crystal grain to grain boundary interface.

(1) Average Quantity and Variable Quantity of Cr Concentration with a Grain

Figure 12:
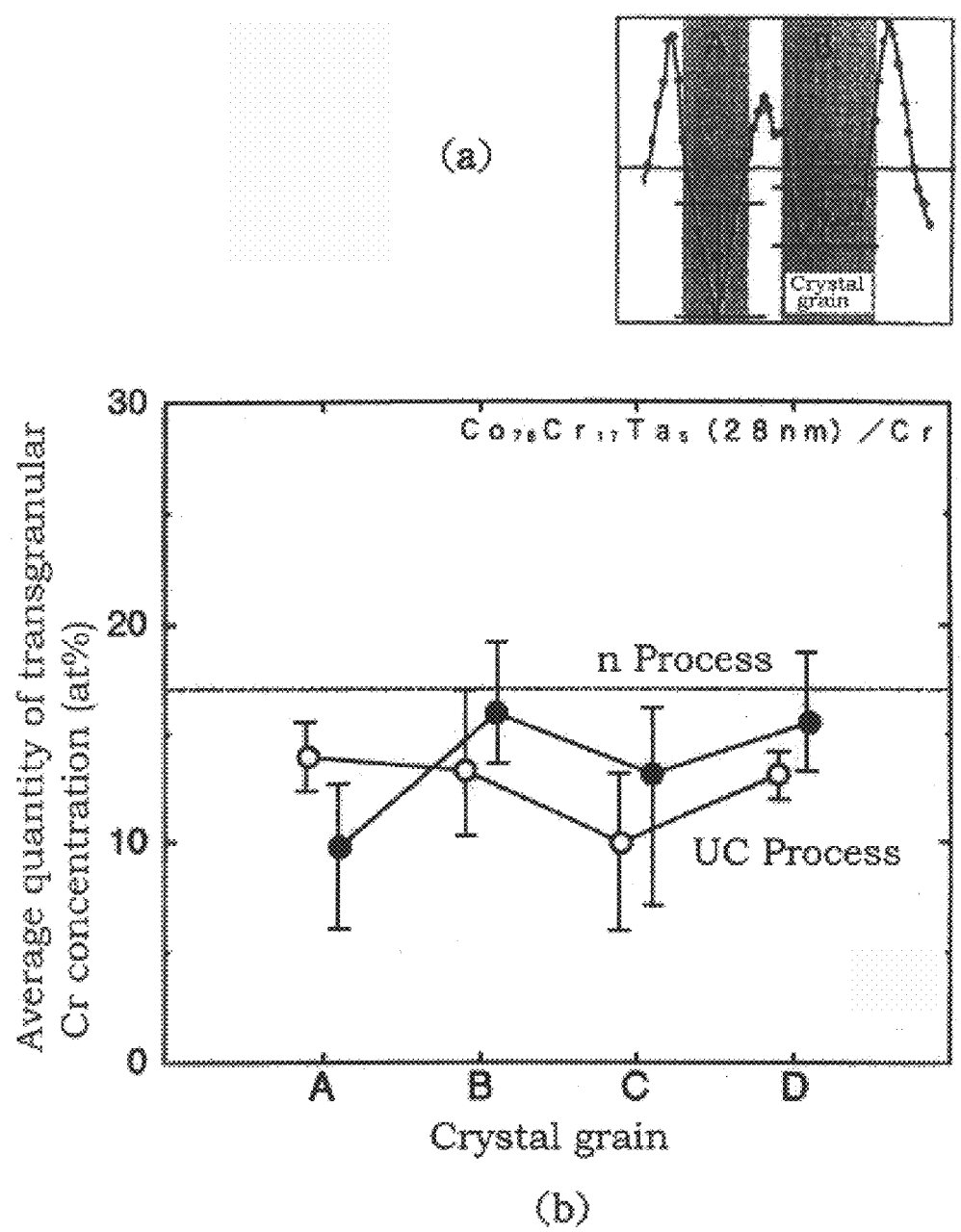
FIG. 12(b) is a graph showing a transgranular average Cr concentration and a change of concentration distribution in a UC process medium and n process medium.
FIG. 12(a) is a graph showing a Cr concentration distribution, explicitly showing numbering of evaluated crystal grains and ranges in which transgranular average Cr concentrations are measured.

FIG. 12, is a graph showing average quantities and variable quantities of transgranular Cr concentration in the UC process medium and the n process medium. As shown in FIG. 12(a), evaluated crystal grain are numbered and shown by alphabetical letters in the abscissa of FIG. 12(b). In the figure, points indicate average Cr concentrations of grains and error bars indicate variation ranges. With respect to average Cr concentration within a grain, it is found that the UC process medium shows about 13 at %, while the n process medium shows about 15 at %. This means that, in the UC process medium, disorption of Cr from the inside of a grain is promoted. Further, it is found that, in the UC process medium, a variation range of Cr concentration tends to be relatively small, and thus more uniform disorption has occurred.

Figure 13:
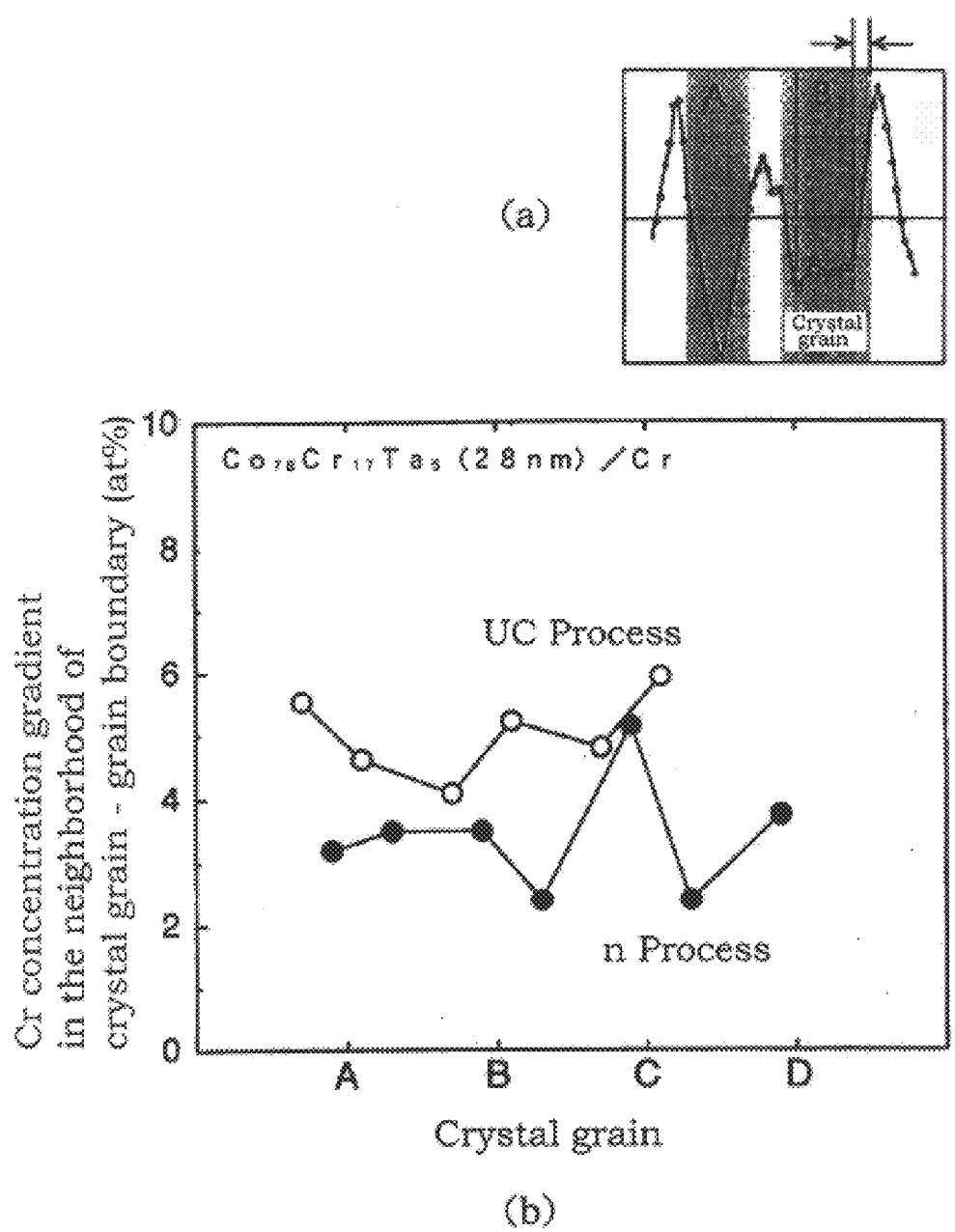
FIG. 13(b) is a graph showing change of concentration gradient in the neighborhood of interface between crystal grains and Cr grain boundary segregation layer.
FIG. 13(a) is a graph showing a Cr concentration distribution, explicitly showing numbering of evaluated crystal grains and a range in which a Cr concentration gradient exists.

(2) Cr Concentration Gradient in the Neighborhood of a Crystal Grain to Grain Boundary Interface FIG. 13 is a graph showing Cr concentration gradient in the neighborhood of a crystal grain to grain boundary interface, in the UC process medium and the n process medium. As shown in FIG. 13(a), evaluated crystal grains are numbered, and shown by alphabetical letters in the abscissa of FIG. 13(b). Further, analysis of Cr concentration gradient is carried out for regions of 2 to 3 nm of a crystal grain surface layers showing a rapid change in Cr concentration. As a value of Cr concentration gradient, the UC process medium shows about 5 at % nm, while the n process medium shows about 3 at % nm. In particular, in the UC process medium, Cr concentration gradients of more than or equal to 4 at % nm are stably obtained. This means that, in the UC process medium, disorption of Cr from the inside of a grain to the grain boundary is further promoted.

Each of the above results means that, in the UC process medium, disorption of Cr from the inside of a grain to the grain boundary is promoted. From these results, it is considered that purification of a film formation atmosphere (i.e., the UC process) improves mobility of Cr diffusion.

Figure 14:
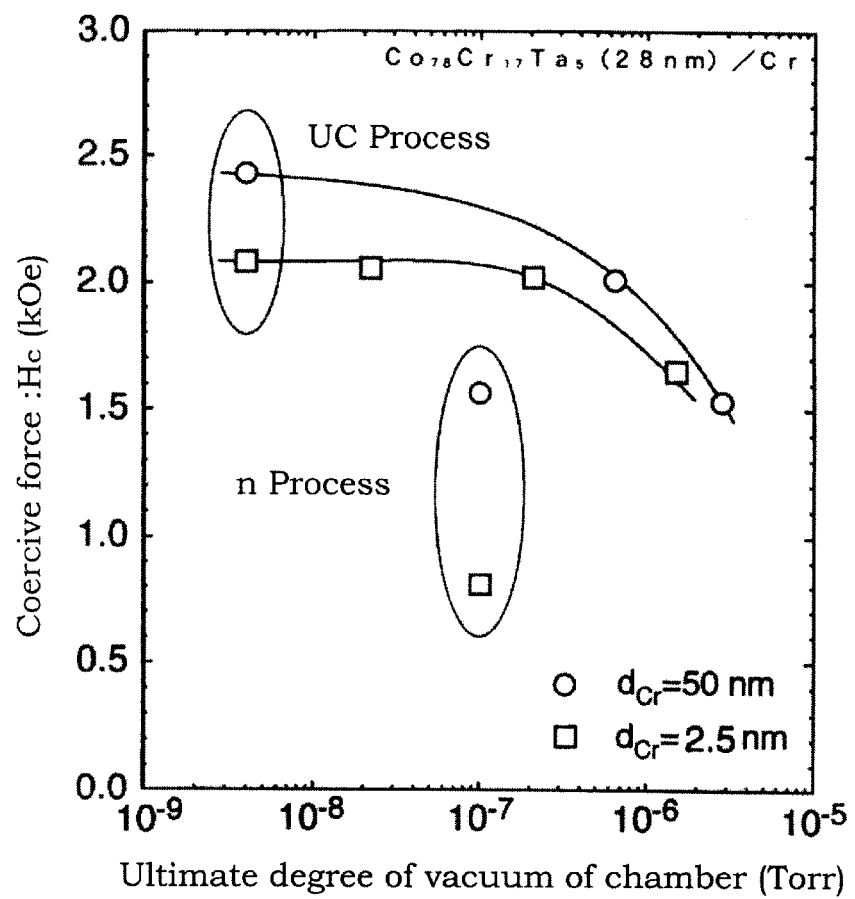
FIG. 14 is a graph showing relation between coercive force and ultimate degree of vacuum of a deposition chamber, in a UC process medium, the figure also showing results in an n process medium.
Figure 15:
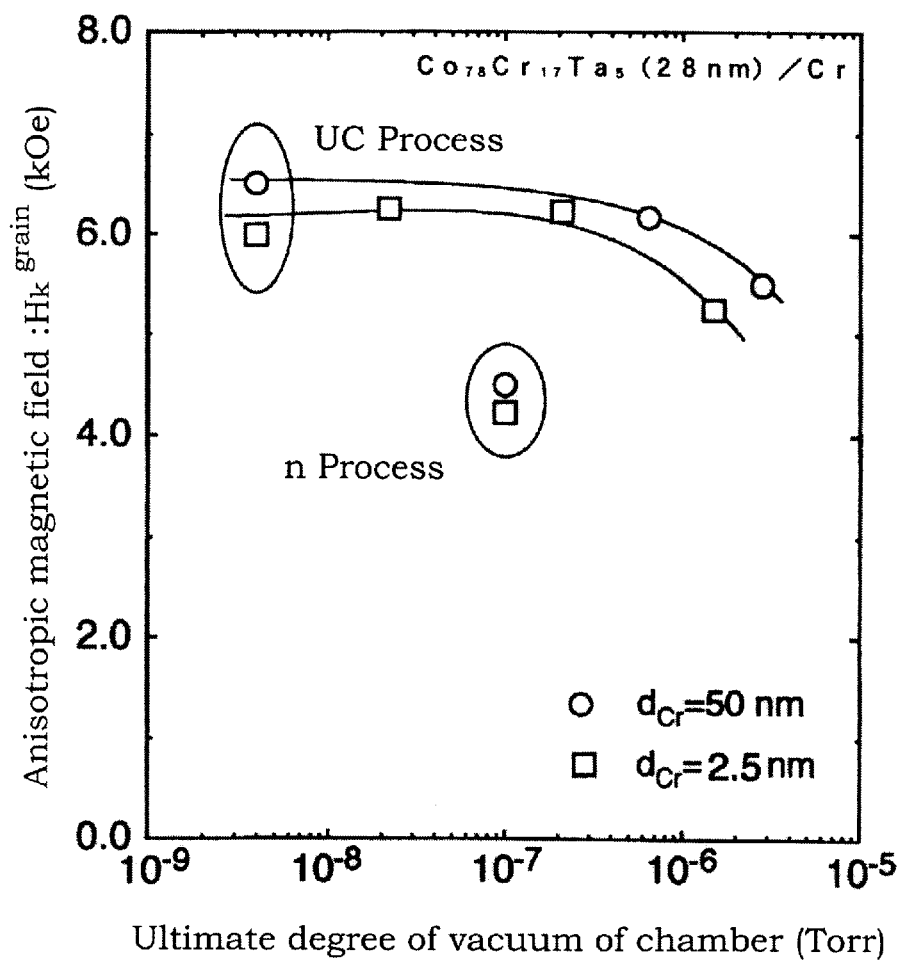
FIG. 15 is a graph showing relation between anisotropic magnetic field and ultimate degree of vacuum of a deposition chamber, in a UC process medium, the figure also showing results in an n process medium.
Figure 16:
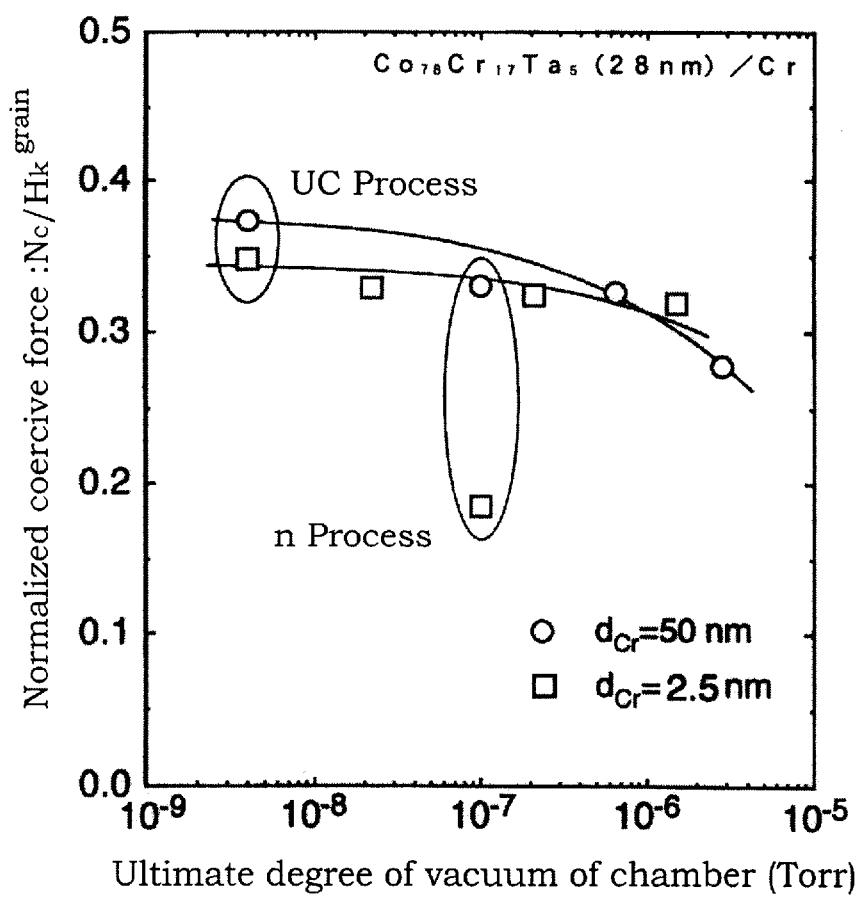
FIG. 16 is a graph showing relation between normalized coercive force and ultimate degree of vacuum of a deposition chamber, in a UC process medium, the figure also showing results in an n process medium.
Figure 17:
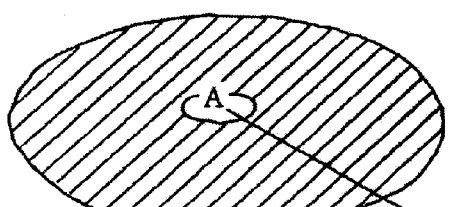
FIG. 17 is a schematic cross section showing layer structure of a magnetic recording medium.
Figure 17:
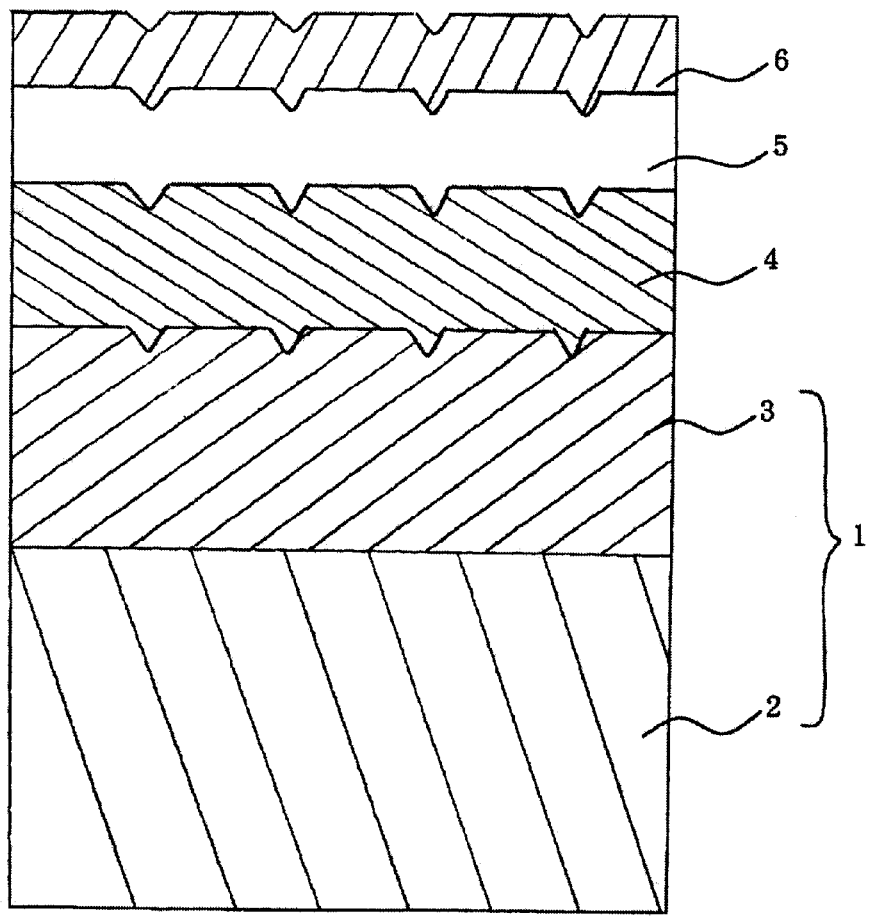

FIGS. 14 through 16 show results on magnetic characteristics of a medium manufactured by the UC process, varying ultimate degree of vacuum of the deposition chamber in which a metal underlying layer and a ferromagnetic metal layer are formed, in the range of the level of $10^{-6}$ torr to $10^{-9}$ Torr. FIGS. 14, 15 and 16 show graphs summarizing coercive forces (Hc), anisotropic magnetic fields (Hk$^{grain}$), and normalized coercive forces (Hc/Hk$^{grain}$), respectively. IN the graphs of FIGS. 5 through 7, the mark ○ indicates a result of a medium having Cr underlying layer of 50 nm in film thickness, and the mark ● indicates a result of a medium having Cr underlying layer of 2.5 nm in film thickness. At that time, film thickness of the magnetic layer is fixed at 20 nm.

From FIGS. 14 through 16, it is found that, when the ultimate degree of vacuum is set at the level of $10^{-7}$ Torr or less, the UC process medium has higher values in all magnetic characteristics, i.e., a coercive force, an anisotropic magnetic field, and a normalized coercive force, without depending on film thickness of Cr, in comparison with the n process medium. Further, it becomes clear that, in the UC process medium satisfying this condition, the maximum Cr concentration in the third region (a region in the central part of a crystal grain, in which Cr concentration is lower than the neighborhood of the grain boundary) is less than or equal to 0.75 times the maximum Cr concentration in the second region (a region in which Cr concentration increase toward the grain boundary, in a crystal grain of the ferromagnetic metal layer).

Accordingly, it is found that, by making the maximum Cr concentration in the third region less than or equal to 0.75 times the maximum Cr concentration in the second region, it is possible to obtain a magnetic recording medium, in which high values can be stably attained in all the magnetic characteristics, i.e., a coercive force, an anisotropic magnetic field, and normalized coercive force, and in addition, that effect is achieved even with such an ultrathin Cr underlying layer as of 2.5 nm in width.

As described above, according to the present invention, it is possible to obtain a magnetic recording medium that has high values in a coercive force, an anisotropic magnetic field, and/or a normalized coercive force, and is adaptable to promotion of high recording density. Further, the above magnetic characteristics can be obtained with an ultrathin Cr underlying layer, and accordingly, it is possible to suppress surface roughness of the medium to the same level as the surface roughness of the substrate body. Thus, it is possible to provide a magnetic recording medium that is sufficiently adaptable to lowering of flying height of a head.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A magnetic recording medium utilizing magnetic reversal, said medium comprising:
    a base body having a surface roughness of less than 1 nm when measured as a center line average height; and
    a ferromagnetic metal layer that contains at least Co and Cr and is provided on said base body via a metal underlying layer of Cr of thickness 10 nm or less, wherein between crystal grains constituting said ferromagnetic metal layer, said magnetic recording medium has a first region in which Cr segregates from said metal underlying layer and which penetrates said ferromagnetic metal layer,
    in said first region the Cr concentration being lower in a middle region in a thicknesswise direction of said ferromagnetic metal layer than in a surface region of said ferromagnetic metal layer away from said base body and proximate said metal underlying layer.

2. A magnetic recording medium according to claim 1, wherein:
    a crystal grain of said ferromagnetic metal layer comprises a second region in which Cr concentration increases toward a grain boundary and a third region in a central part of the crystal grain, wherein Cr concentration is lower than the Cr concentration proximate the grain boundary; and
    a maximum value of Cr concentration in said third region is smaller than a maximum value of Cr concentration in said second region.

3. A magnetic recording medium according to claim 2, wherein:
    the maximum value of Cr concentration in said third region is less than or equal to 0.75 times the maximum value of Cr concentration in said second region.

4. A magnetic recording medium according to claim 2, wherein a Cr concentration gradient in said second region is 4 at % nm or more.

5. A magnetic recording medium utilizing magnetic reversal, said magnetic recording medium compromising:
    a base body;
    an intermediate metal layer of Cr overlaying said base body; and
    a ferromagnetic layer that contains at least Co and Cr, said ferromagnetic metal layer being provided on said base body via said intermediate metal layer, said ferromagnetic metal layer including a crystal grain region and a grain boundary region, Cr segregating from said intermediate metal layer and penetrating said grain boundary region of said ferromagnetic metal layer, a Cr concentration in said crystal grain region being lower in a middle region in a thicknesswise direction of said ferromagnetic metal layer than in a surface region of said ferromagnetic metal layer proximate said intermediate metal layer.

6. A magnetic recording medium according to claim 5, wherein said crystal grain region comprises a surface region of said grain boundary region in which Cr concentration increases toward the grain boundary region, and a central region in which Cr concentration is smaller in the center portion than in the surface region of said grain boundary region, and
    a maximum value of Cr concentration in said central region is smaller than a maximum value of Cr concentration in said surface region of said grain boundary region.

7. A magnetic recording medium according to claim 6, wherein the maximum value of Cr concentration in said central region is less than or equal to 0.75 times the maximum value of Cr concentration in said surface region of said grain boundary region.

8. A magnetic recording medium according to claim 6, wherein a Cr concentration gradient in said surface region of said grain boundary region is 4 at % nm or more.

* * * * *